United States Patent
Kwak et al.

(10) Patent No.: US 11,799,167 B2
(45) Date of Patent: *Oct. 24, 2023

(54) ENERGY STORAGE MODULE HAVING EXTINGUISHER SHEET

(71) Applicant: Samsung SDI Co., Ltd., Yongin-si (KR)

(72) Inventors: Eun Ok Kwak, Yongin-si (KR); Jin Bhum Yun, Yongin-si (KR); Jang Hoon Kim, Yongin-si (KR); Jin Taek Kim, Yongin-si (KR); Jong Yeol Woo, Yongin-si (KR); Kwang Deuk Lee, Yongin-si (KR); Woo Sung Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/901,522

(22) Filed: Jun. 15, 2020

(65) Prior Publication Data

US 2021/0074979 A1 Mar. 11, 2021

(30) Foreign Application Priority Data

Sep. 5, 2019 (KR) .................. 10-2019-0110361

(51) Int. Cl.
*H01M 50/342* (2021.01)
*H01M 50/383* (2021.01)

(52) U.S. Cl.
CPC ....... *H01M 50/383* (2021.01); *H01M 50/342* (2021.01)

(58) Field of Classification Search
CPC .................................................. H01M 50/383
See application file for complete search history.

(56) References Cited

U.S. PATENT DOCUMENTS 5,047,272 A * 9/1991 Hassel .................. B32B 27/20
428/40.4
5,817,434 A 10/1998 Brooker et al.
(Continued)

FOREIGN PATENT DOCUMENTS

CN 102468463 A 5/2012
CN 106654462 A 5/2017
(Continued)

OTHER PUBLICATIONS

Collins Online Dictionary entry for "space", accessed at https://www.collinsdictionary.com/us/dictionary/english/space on May 18, 2022 (Year: 2022).*

(Continued)

*Primary Examiner* — Amanda J Barrow
(74) *Attorney, Agent, or Firm* — Lewis Roca Rothgerber Christie LLP

(57) ABSTRACT

An energy storage module includes: a cover member accommodating a plurality of battery cells in an internal receiving space, the battery cells being arranged in a first direction, each of the battery cells including a vent; a top plate coupled to a top of the cover member and including a duct corresponding to the vent of each of the battery cells; a top cover coupled to a top of the top plate and having a discharge opening corresponding to the duct; and an extinguisher sheet between the top cover and the top plate, the extinguisher sheet being configured to emit a fire extinguishing agent at a reference temperature.

21 Claims, 24 Drawing Sheets

(56) References Cited

U.S. PATENT DOCUMENTS

| | | | |
|---|---|---|---|
| 6,136,423 A * | 10/2000 | Fitzpatrick | B29C 73/163 |
| | | | 428/304.4 |
| 6,365,299 B1 | 4/2002 | Miyaki et al. | |
| 7,385,480 B2 * | 6/2008 | Fitzpatrick | A62C 99/0045 |
| | | | 169/58 |
| 8,597,808 B2 | 12/2013 | Park et al. | |
| 8,652,666 B2 | 2/2014 | Kim | |
| 9,406,917 B2 | 8/2016 | Petzinger | |
| 9,627,663 B2 | 4/2017 | Kim | |
| 10,164,229 B2 | 12/2018 | Ohshiba et al. | |
| 10,355,326 B2 | 7/2019 | Petzinger | |
| 10,930,910 B2 * | 2/2021 | Fujiwara | H01M 50/3425 |
| 11,145,933 B2 | 10/2021 | Kim et al. | |
| 11,185,726 B2 | 11/2021 | Lee | |
| 2002/0179552 A1 | 12/2002 | Marraffa | |
| 2003/0134203 A1 | 7/2003 | Fan et al. | |
| 2007/0164711 A1 * | 7/2007 | Kim | H01M 10/6595 |
| | | | 320/149 |
| 2010/0167115 A1 | 7/2010 | Okada et al. | |
| 2010/0248026 A1 * | 9/2010 | Hinoki | H01M 4/62 |
| | | | 429/209 |
| 2011/0005781 A1 * | 1/2011 | Yasui | B60L 58/27 |
| | | | 169/54 |
| 2011/0165454 A1 | 7/2011 | Iwamoto et al. | |
| 2011/0274951 A1 * | 11/2011 | Yasui | H01M 50/512 |
| | | | 429/99 |
| 2011/0313084 A1 * | 12/2011 | Furar | C08G 18/73 |
| | | | 524/101 |
| 2012/0114993 A1 | 5/2012 | Park et al. | |
| 2012/0270083 A1 | 10/2012 | Kim | |
| 2013/0011701 A1 | 1/2013 | Petzinger | |
| 2013/0052452 A1 | 2/2013 | Lee et al. | |
| 2013/0264077 A1 | 10/2013 | Jung | |
| 2013/0313466 A1 | 11/2013 | Bliznets et al. | |
| 2014/0170447 A1 * | 6/2014 | Woehrle | A62D 1/0007 |
| | | | 429/61 |
| 2014/0322566 A1 | 10/2014 | Kim | |
| 2015/0064514 A1 | 3/2015 | Wu et al. | |
| 2015/0099191 A1 | 4/2015 | Liu et al. | |
| 2015/0221914 A1 | 8/2015 | Page et al. | |
| 2015/0280193 A1 | 10/2015 | Ohshiba et al. | |
| 2015/0303421 A1 | 10/2015 | Tazawa et al. | |
| 2016/0049626 A1 | 2/2016 | Yasui et al. | |
| 2016/0104880 A1 * | 4/2016 | Gao | H01M 4/505 |
| | | | 429/217 |
| 2016/0218333 A1 | 7/2016 | Takasaki et al. | |
| 2016/0254515 A1 | 9/2016 | Shimoda et al. | |
| 2016/0268564 A1 * | 9/2016 | Cho | H01M 50/20 |
| 2016/0315361 A1 | 10/2016 | Petzinger | |
| 2017/0165513 A1 * | 6/2017 | Li | B60L 3/0046 |
| 2017/0334310 A1 | 11/2017 | Yokoyama et al. | |
| 2018/0026245 A1 * | 1/2018 | Page | H01M 10/4207 |
| | | | 429/82 |
| 2018/0190956 A1 | 7/2018 | Lica et al. | |
| 2018/0248160 A1 * | 8/2018 | Lee | A62D 1/0028 |
| 2018/0269440 A1 | 9/2018 | Lee et al. | |
| 2018/0294516 A1 | 10/2018 | Huang et al. | |
| 2018/0309107 A1 | 10/2018 | Widener | |
| 2019/0109331 A1 * | 4/2019 | Skala | H01M 8/04447 |
| 2019/0168037 A1 * | 6/2019 | Lian | H01M 50/60 |
| 2019/0168615 A1 | 6/2019 | Besson et al. | |
| 2019/0173074 A1 * | 6/2019 | Ogawa | H01M 50/10 |
| 2019/0181419 A1 | 6/2019 | Suba et al. | |
| 2019/0305391 A1 | 10/2019 | Petzinger | |
| 2019/0334143 A1 * | 10/2019 | Sugeno | H01M 50/20 |
| 2020/0014027 A1 * | 1/2020 | Ha | H01M 10/4235 |
| 2020/0014078 A1 * | 1/2020 | Ha | H01M 10/0525 |
| 2020/0168884 A1 | 5/2020 | Wang et al. | |
| 2020/0243823 A1 | 7/2020 | Morita | |
| 2020/0287180 A1 | 9/2020 | Chen et al. | |
| 2020/0303701 A1 * | 9/2020 | Kim | H01M 50/271 |
| 2020/0350557 A1 * | 11/2020 | Ha | H01M 4/136 |
| 2020/0350566 A1 * | 11/2020 | Ha | H01M 4/364 |
| 2020/0350567 A1 * | 11/2020 | Ha | H01M 4/366 |
| 2020/0350568 A1 * | 11/2020 | Lee | H01M 4/622 |
| 2020/0350574 A1 * | 11/2020 | Ha | H01M 4/525 |
| 2020/0350580 A1 * | 11/2020 | Ha | H01M 4/621 |
| 2020/0350632 A1 * | 11/2020 | Ha | H01M 4/364 |
| 2020/0377690 A1 | 12/2020 | Ootsuki et al. | |
| 2021/0013460 A1 | 1/2021 | Ootsuki et al. | |
| 2021/0296625 A1 * | 9/2021 | Li | H01M 50/124 |
| 2021/0320337 A1 * | 10/2021 | Chen | H01M 50/204 |
| 2021/0328281 A1 * | 10/2021 | Chu | H01M 10/52 |
| 2021/0328304 A1 * | 10/2021 | You | A62C 3/16 |
| 2022/0059902 A1 | 2/2022 | Jiang et al. | |
| 2022/0069411 A1 * | 3/2022 | Wakabayashi | H01M 50/227 |
| 2022/0140434 A1 | 5/2022 | Yoshida et al. | |
| 2022/0149477 A1 | 5/2022 | Yoshida et al. | |
| 2022/0149478 A1 | 5/2022 | Egashira et al. | |

FOREIGN PATENT DOCUMENTS

| | | | | |
|---|---|---|---|---|
| CN | 106785225 A | 5/2017 | | |
| CN | 206564279 U | 10/2017 | | |
| CN | 206584999 U | 10/2017 | | |
| CN | 206834290 U | 1/2018 | | |
| CN | 107887550 A | 4/2018 | | |
| CN | 207199806 U | 4/2018 | | |
| CN | 207977389 U | 10/2018 | | |
| CN | 109585726 A | 4/2019 | | |
| EP | 3386003 A1 | 10/2018 | | |
| EP | 3591737 A1 | 1/2020 | | |
| EP | 3 866 233 A1 | 8/2021 | | |
| JP | 6245038 B2 | 11/2015 | | |
| JP | 2016-110881 A | 6/2016 | | |
| JP | 6390062 B2 | 6/2016 | | |
| JP | 2018-106879 | * | 5/2018 | H01M 4/13 |
| JP | 2019-213332 A | 12/2019 | | |
| KR | 10-1067627 B1 | 9/2011 | | |
| KR | 10-2012-0049020 A | 5/2012 | | |
| KR | 10-2012-0119407 A | 10/2012 | | |
| KR | 10-2014-0127743 A | 11/2014 | | |
| KR | 10-2016-0021325 A | 2/2016 | | |
| KR | 10-2016-0146349 A | 12/2016 | | |
| KR | 10-2019-0023917 | * | 3/2019 | H01M 10/613 |
| WO | 2013/006796 A1 | 1/2013 | | |
| WO | 2019/117485 A1 | 6/2019 | | |
| WO | WO 2019/117485 | * | 6/2019 | H01M 50/271 |
| WO | WO 2020/203646 A1 | 10/2020 | | |

OTHER PUBLICATIONS

Google define feature utilizing Oxford Languages Dictionary for "space", accessed at google.com on May 18, 2022 (Year: 2022).*

EPO Extended Search Report dated Feb. 16, 2021, issued in corresponding European Patent Application No. 20194587.0 (10 pages).

European Patent Office Extended Search Report, for Patent Application No. 20194573.0, dated Feb. 12, 2021, 9 pages.

European Patent Office Extended Search Report, for Patent Application No. 20194592.0, dated Feb. 8, 2021, 9 pages.

European Patent Office Extended Search Report, for Patent Application No. 20194611.8, dated Feb. 16, 2021, 9 pages.

European Patent Office Extended Search Report, for Patent Application No. 20194589.6, dated Mar. 5, 2021, 9 pages.

European Patent Office Extended Search Report, for Patent Application No. 20194607.6, dated Feb. 8, 2021, 10 pages.

European Patent Office Extended Search Report, for Patent Application No. 20194594.6, dated Feb. 10, 2021, 9 pages.

"The Engineering Tool Box", https://www.engineeringtoolbox.com/density-materials-d1652.html, Aug. 30, 2021 (Year: 2021), 16 pages.

U.S. Notice of Allowance from U.S. Appl. No. 16/901,538, dated Mar. 18, 2022, 8 pages.

U.S. Notice of Allowance from U.S. Appl. No. 16/901,547, dated Jul. 23, 2021, 8 pages.

U.S. Office Action from U.S. Appl. No. 16/844,914, dated Aug. 19, 2021, 18 pages.

U.S. Office Action from U.S. Appl. No. 16/844,914, dated Mar. 17, 2022, 24 pages.

(56) References Cited

OTHER PUBLICATIONS

U.S. Office Action from U.S. Appl. No. 16/844,914, dated Nov. 9, 2021, 18 pages.
U.S. Office Action from U.S. Appl. No. 16/901,474, dated Oct. 20, 2021, 21 pages.
U.S. Office Action from U.S. Appl. No. 16/901,538, dated Nov. 23, 2021, 20 pages.
U.S. Office Action from U.S. Appl. No. 16/901,541, dated Dec. 8, 2021, 32 pages.
U.S. Office Action from U.S. Appl. No. 16/901,541, dated Mar. 22, 2022, 17 pages.
U.S. Office Action from U.S. Appl. No. 17/014,061, dated Feb. 15, 2022, 20 pages.
U.S. Office Action from U.S. Appl. No. 17/014,853, dated Dec. 13, 2021, 39 pages.
U.S. Office Action from U.S. Appl. No. 17/014,900, dated Dec. 10, 2021, 21 pages.
U.S. Office Action from U.S. Appl. No. 17/014,900, dated Mar. 28, 2022, 8 pages.
U.S. Office Action from U.S. Appl. No. 17/014,970, dated Mar. 2, 2022, 38 pages.
U.S. Office Action from U.S. Appl. No. 17/014,976, dated Dec. 22, 2021, 24 pages.
U.S. Restriction Requirement from U.S. Appl. No. 16/844,914, dated May 12, 2021, 6 pages.
U.S. Restriction Requirement from U.S. Appl. No. 17/014,970, dated Oct. 22, 2021, 6 pages.
Machine English Translation of CN207199806U, 3 pages.
PubChem Compound Summary for Vermiculite, retrieved on Apr. 5, 2022 from the Internet: https://pubchem.ncbi.nlm.nih.gov/compound/156593754 (Year: 2022).
U.S. Advisory Action from U.S. Appl. No. 16/844,914, dated Jan. 20, 2022, 4 pages.
U.S. Office Action from U.S. Appl. No. 16/901,527, dated Apr. 11, 2022, 24 pages.
U.S. Office Action from U.S. Appl. No. 16/901,474, dated Apr. 25, 2022, 37 pages.
Advisory Action for U.S. Appl. No. 16/901,474 dated Jul. 7, 2022, 4 pages.
Final Office Action for U.S. Appl. No. 17/014,853 dated May 31, 2022, 24 pages.
Final Office Action for U.S. Appl. No. 17/014,970 dated Jun. 24, 2022, 38 pages.
Final Office Action for U.S. Appl. No. 17/014,976 dated Jun. 7, 2022, 24 pages.
Final Office Action for U.S. Appl. No. 16/844,914 dated Jul. 20, 2022, 8 pages.
Final Office Action for U.S. Appl. No. 17/014,061 dated Jul. 18, 2022, 16 pages.
Notice of Allowance for U.S. Appl. No. 16/901,541 dated Jun. 1, 2022, 8 pages.
Notice of Allowance for U.S. Appl. No. 16/901,541 dated Jul. 27, 2022, 8 pages.
Notice of Allowance for U.S. Appl. No. 17/014,976 dated Aug. 16, 1022, 9 pages.
Office Action for U.S. Appl. No. 16/901,474 dated Aug. 17, 2022, 22 pages.
Notice of Allowance for U.S. Appl. No. 16/844,914 dated Dec. 8, 2022, 8 pages.
Notice of Allowance for U.S. Appl. No. 16/901,474 dated Dec. 13, 2022, 10 pages.
Notice of Allowance for U.S. Appl. No. 16/901,538 dated Nov. 23, 2022, 9 pages.
Notice of Allowance for U.S. Appl. No. 16/901,541 dated Dec. 14, 2022, 8 pages.
Notice of Allowance for U.S. Appl. No. 17/014,034 dated Jan. 27, 2023, 7 pages.
Notice of Allowance for U.S. Appl. No. 17/014,900 dated Feb. 13, 2023, 8 pages.
Notice of Allowance for U.S. Appl. No. 17/014,976 dated Dec. 7, 2022, 8 pages.
Office Action for U.S. Appl. No. 17/014,089 dated Dec. 9, 2022, 8 pages.
Advisory Action for U.S. Appl. No. 17/014,061 dated Oct. 21, 2022, 7 pages.
Notice of Allowance for U.S. Appl. No. 17/014,976 dated Oct. 19, 2022, 8 pages.
Final Office Action for U.S. Appl. No. 16/901,527 dated Oct. 4, 2022, 22 pages.
Office Action for U.S. Appl. No. 17/014,034 dated Oct. 4, 2022, 15 pages.
Office Action for U.S. Appl. No. 17/014,853 dated Oct. 4, 2022, 25 pages.
Office Action for U.S. Appl. No. 17/014,970 dated Oct. 5, 2022, 38 pages.
Advisory Action for U.S. Appl. No. 17/014,970 dated Sep. 9, 2022, 3 pages.
Final Office Action for U.S. Appl. No. 17/014,034 dated May 25, 2022, 38 pages.
Notice of Allowance for U.S. Appl. No. 16/844,914 dated Sep. 28, 2022, 7 pages.
Notice of Allowance for U.S. Appl. No. 16/901,538 dated Sep. 16, 2022, 9 pages.
Notice of Allowance for U.S. Appl. No. 17/014,900 dated Aug. 30, 2022, 8 pages.
U.S. Final Office Action dated Apr. 13, 2023, issued in U.S. Appl. No. 17/014,970 (43 pages).
U.S. Final Office Action dated Mar. 13, 2023, issued in U.S. Appl. No. 17/014,853 (20 pages).
U.S. Office Action dated Mar. 15, 2023, issued in U.S. Appl. No. 17/014,061 (16 pages).
U.S. Office Action dated Feb. 24, 2023, issued in U.S. Appl. No. 16/901,527 (26 pages).
U.S. Notice of Allowance dated Mar. 7, 2023, issued in U.S. Appl. No. 17/014,089 (11 pages).
U.S. Office Action dated Jun. 30, 2023, issued in U.S. Appl. No. 17/014,853 (31 pages).
U.S. Office Action dated Aug. 30, 2023, issued in U.S. Appl. No. 17/014,970 (22 pages).

\* cited by examiner

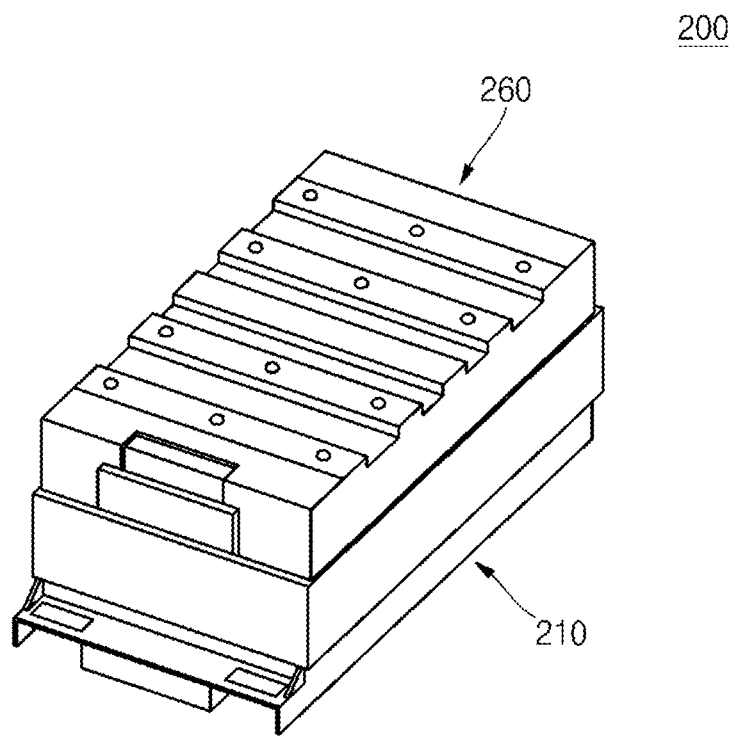
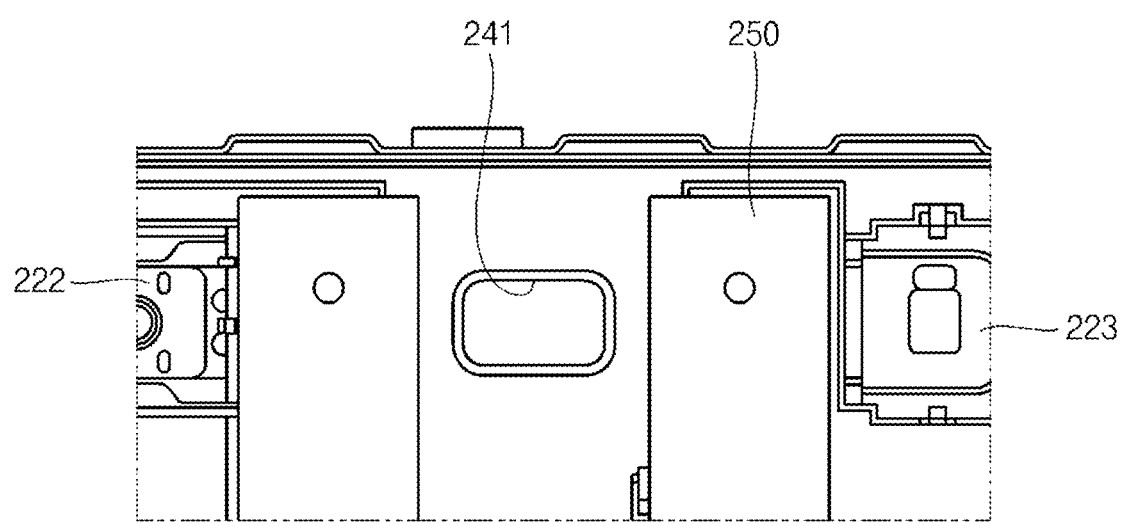
FIG. 15

Partially blocking pores through melt-down function

Completely blocking pores->Preventing Li movement

ENERGY STORAGE MODULE HAVING EXTINGUISHER SHEET

CROSS-REFERENCE TO RELATED APPLICATION

This application claims priority to and the benefit of Korean Patent Application No. 10-2019-0110361, filed on Sep. 5, 2019 in the Korean Intellectual Property Office, the content of which is herein incorporated by reference in its entirety.

BACKGROUND

1. Field

Aspects of embodiments of the present disclosure relate to an energy storage module.

2. Description of the Related Art

An energy storage module may be configured to be linked to a renewal energy and/or power system, such as, for example, a solar cell, to store electric power when demand for electric power from a load is low and to use (e.g., to discharge or provide) the stored electric power when demand for electric power is high. The energy storage module generally includes (or is) an apparatus including a relatively large quantity of battery cells (e.g., secondary batteries or secondary battery cells). The energy storage module generally exhibits high-capacity and high-output characteristics, and research into technology to increase the safety of energy storage modules is being actively conducted.

The battery cells are generally received in (or placed on or fixed to) multiple trays, which are received (or accommodated) in a rack, and multiple racks are received (or accommodated) in a container box.

However, there have recently been instances of energy storage modules catching fire. Once a fire starts in an energy storage module, it is not easy to extinguish due to the characteristics of the energy storage module.

SUMMARY

Embodiments of the present disclosure are related to an energy storage module exhibiting a reduced fire risk and exhibiting increased safety by reducing or minimizing the chance of a fire spreading between adjacent battery cells when a fire occurs. These and other aspects and features of the present disclosure will be described in or will be apparent from the following description of exemplary embodiments of the present disclosure.

According to an embodiment of the present disclosure, an energy storage module includes: a cover member accommodating a plurality of battery cells in an internal receiving space, the battery cells being arranged in a first direction, each of the battery cells including a vent; a top plate coupled to a top of the cover member and including a duct corresponding to the vent of each of the battery cells; a top cover coupled to a top of the top plate and having a discharge opening corresponding to the duct; and an extinguisher sheet between the top cover and the top plate, the extinguisher sheet being configured to emit a fire extinguishing agent at a reference temperature.

The extinguisher sheet may have an opening corresponding to the duct.

The extinguisher sheet may extend in the first direction.

The energy storage module may further include a plurality of insulation spacers respectively between adjacent ones of the battery cells.

The top plate may have openings respectively corresponding to the insulation spacers.

The extinguisher sheet may be over the openings in top plate and over the insulation spacers.

The extinguisher sheet may have a receiving space with an outer cover comprising polyurea or polyurethane and a fire extinguishing agent in the receiving space.

The receiving space may be a capsule or tube.

The fire extinguishing agent may include halogen carbon.

The extinguisher sheet may include a plurality of sheets respectively configured to emit the fire extinguishing agent at different temperatures.

The sheets of the extinguisher sheet may be stacked on each other.

The energy storage module may further include a plurality of the extinguisher sheets.

Each of the extinguisher sheets may extend in the first direction.

A first one of the extinguisher sheets may be between a first electrode terminal of one of the battery cells and the vent of the one of the battery cells, and a second one of the extinguisher sheets may be between a second electrode terminal of the one of the battery cells and the vent of the one of the battery cells.

The extinguisher sheets may be spaced from the battery cells by a first distance, and an upper end of the duct may be spaced from the battery cells by a second distance, the first distance being greater than the second distance.

A proportion of the fire extinguishing agent may be contained in the extinguisher sheet to the total weight of the extinguisher sheet is in a range from 30% to 50%.

The fire extinguishing agent may be contained in the extinguisher sheet in an amount of 0.12 g/cm$^3$ to 0.82 g/cm$^3$.

Each of the battery cells may include: a negative electrode including: a negative electrode current collector; a negative electrode active material layer on the negative electrode current collector; and a negative electrode function layer on the negative electrode active material layer; and a positive electrode including: a positive electrode current collector; and a positive electrode active material layer on the positive electrode current collector. The negative electrode function layer may include flake-shaped polyethylene particles, and the positive electrode active material layer may include a first positive electrode active material including at least one composite oxide of lithium and a metal selected from the group consisting of cobalt (Co), manganese (Mn), nickel (Ni), and a combination of these metals and a second positive electrode active material including a compound represented by the Chemical Formula (1):

$$LiaFe_{1-x}M_xPO_4 \qquad (1)$$

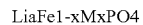

wherein $0.90 \leq a \leq 1.8$, $0 \leq x \leq 0.7$, and M is Mg, Co, Ni, or a combination thereof.

The flake-shaped polyethylene particles may have an average particle diameter (D50) in a range from 1 μm to 8 μm.

The flake-shaped polyethylene particles may have an average particle diameter (D50) in a range from 2 μm to 6 μm.

The flake-shaped polyethylene particles may have a thickness in a range from 0.2 μm to 4 μm.

The first positive electrode active material and the second positive electrode active material may be contained in a weight ratio in a range from 97:3 to 80:20.

As described above, energy storage module according to embodiments of the present disclosure suppresses ignition by providing battery cells having a shut-down function by using compositions of negative and positive electrode active materials. Further, energy storage modules according to embodiments of the present disclosure can prevent or reduce heat from spreading to adjacent battery cells by rapidly extinguishing a fire therein and cooling the battery cell(s) when a vent of the battery cell(s) opens (or ruptures) and/or when a fire occurs.

BRIEF DESCRIPTION OF THE DRAWINGS

FIG. 14 is a perspective view of an energy storage module according to another embodiment of the present disclosure.

FIG. 15 is a plan view illustrating an extinguisher sheet is coupled to a top plate in the energy storage module shown in FIG. 14.

DETAILED DESCRIPTION

Figure 1:
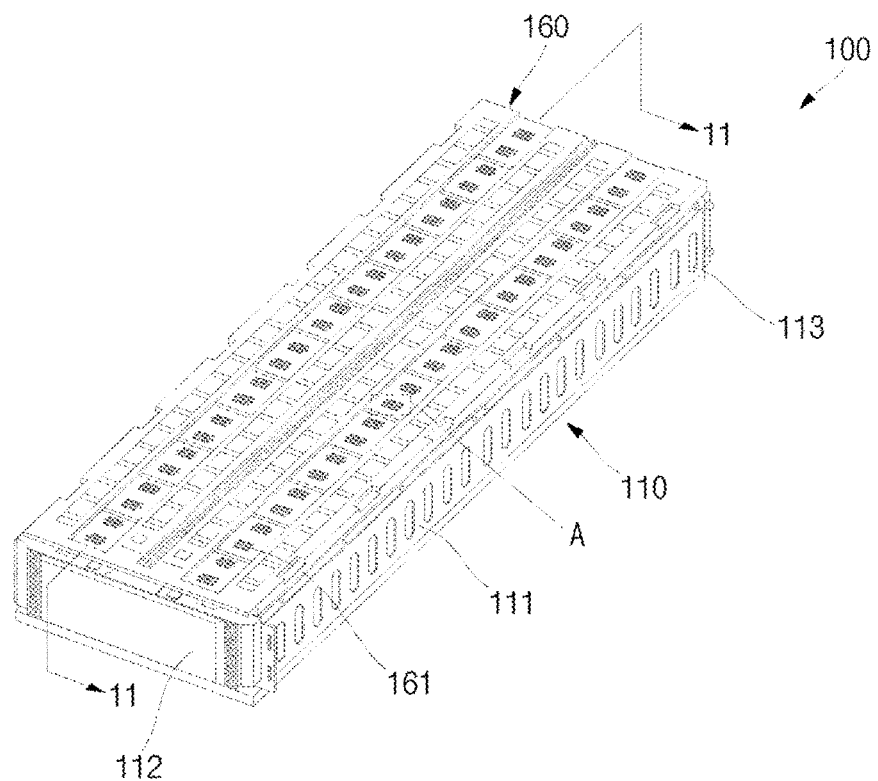
FIG. 1 is a perspective view of an energy storage module according to an embodiment of the present disclosure.

Hereinafter, embodiments of the present disclosure will be described in detail. The subject matter of the present disclosure may, however, be embodied in many different forms and should not be construed as being limited to the example (or exemplary) embodiments set forth herein. Rather, these example embodiments are provided so that this disclosure will be thorough and complete and will fully convey the aspects and features of the present disclosure to those skilled in the art.

In addition, in the accompanying drawings, sizes or thicknesses of various components or layers may be exaggerated for brevity and clarity. Like numbers refer to like elements throughout. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing example embodiments of the present disclosure and is not intended to be limiting of the present disclosure. As used herein, the singular forms are intended to include the plural forms as well, unless the context clearly indicates otherwise.

Further, the use of "may" when describing embodiments of the present disclosure relates to "one or more embodiments of the present disclosure." Expressions, such as "at least one of," when preceding a list of elements, modify the entire list of elements and do not modify the individual elements of the list. In addition, the use of "between" or "from" when describes ranges of values includes the end values.

It will be further understood that the terms "comprise," "comprising," "include," "including," "has," and variations thereof, when used in this specification, specify the presence of the stated features, numbers, steps, operations, elements, and/or components but do not preclude the presence or addition of one or more other features, numbers, steps, operations, elements, components, and/or groups thereof. It will be understood that, although the terms first, second, etc. may be used herein to describe various members, elements, regions, layers, and/or sections, these members, elements, regions, layers, and/or sections should not be limited by these terms. These terms are used to distinguish one member, element, region, layer, and/or section from another. Thus, for example, a first member, a first element, a first region, a first layer, and/or a first section discussed below could be termed a second member, a second element, a second region, a second layer, and/or a second section without departing from the scope of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "over" or "above" the other elements or features. Thus, the exemplary term "below" can encompass both an orientation of above and below.

Hereinafter, a configuration of an energy storage module according to embodiments of the present disclosure will be described.

Figure 2:
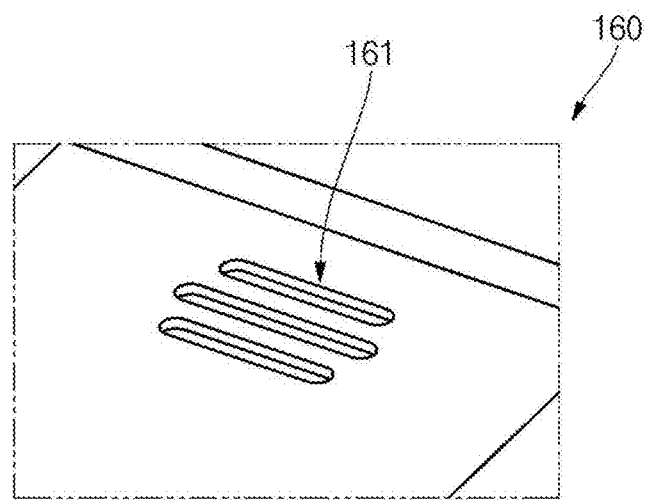
FIG. 2 is a partially enlarged view of the portion A of FIG. 1.
Figure 3:
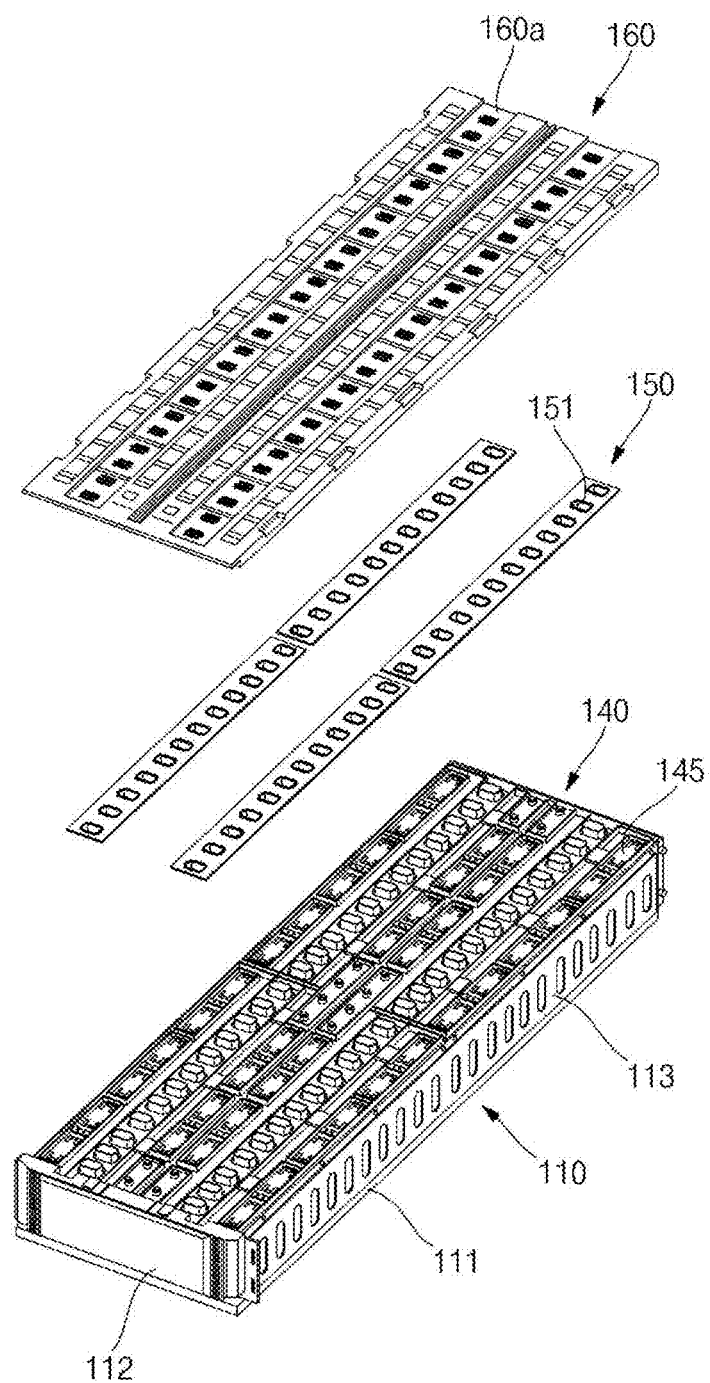
FIG. 3 is an exploded perspective view of the energy storage module shown in FIGS. 1 and 2.
Figure 4:
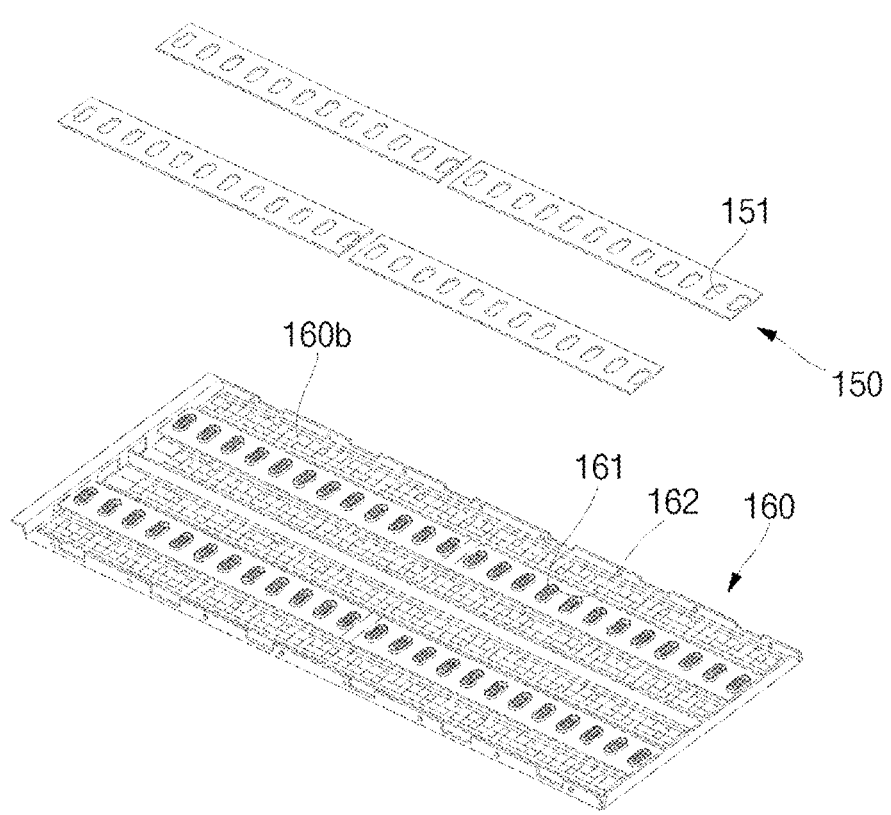
FIG. 4 is an exploded perspective bottom view of an extinguisher sheet and a top cover of the energy storage module shown in FIGS. 1-3.

FIG. 1 is a perspective view of an energy storage module according to an embodiment of the present disclosure, FIG. 2 is a partially enlarged view of the portion A of FIG. 1, FIG. 3 is an exploded perspective view of the energy storage module shown in FIGS. 1 and 2, and FIG. 4 is an exploded perspective bottom view of a bottom surface of an extinguisher sheet and of a top cover of the energy storage module shown in FIGS. 1-3.

Referring to FIGS. 1-4, an energy storage module 100 according to an embodiment of the present disclosure may include a cover member 110, a top plate 140, an extinguisher sheet 150, and a top cover 160.

The cover member 110 may provide an internal space for receiving (or accommodating) battery cells and insulation spacers. The cover member 110 includes a bottom plate 111, an end plate (or a plurality of end plates) 112, and a side plate (or a plurality of side plates) 113 which provide a space in which the battery cells and the insulation spacers are arranged, which will be further described below. In addition, the cover member 110 may fix positions of the battery cells and the insulation spacers and may protect the battery cells from external impacts.

The top plate 140 may be coupled to a top portion (e.g., a top or a top surface) of the cover member 110. The top plate 140 may be coupled to the cover member 110 while covering top portions (e.g., top surfaces) of the battery cells. In addition, positive electrode terminals and negative electrode terminals of the battery cells are exposed to a top portion of (e.g., are exposed through of) the top plate 140 (e.g., are exposed to a top portion of the top plate 140), and bus bars 145 are coupled to the terminals of adjacent ones of the battery cells, thereby connecting (e.g., electrically connecting) the battery cells to one another in series, in parallel, or in series/parallel.

The top plate 140 includes a duct (e.g., a plurality of ducts) 141 corresponding to a vent located on a top surface (e.g., in a cap plate or cap assembly) of each of the battery cells. Accordingly, the gas discharged through the vent of the battery cell may move upwardly along (or through) the duct 141 of the top plate 140. The configuration and operation of the ducts 141 will be described in more detail below.

The extinguisher sheet 150 is positioned between the top plate 140 and the top cover 160. The extinguisher sheet 150 may be one or more members (or sheets) extending in one direction, for example, in a length direction, of the top plate 140. In addition, the extinguisher sheet 150 may include an opening (e.g., an opening hole or a plurality of openings or openings holes) positioned to correspond to the duct 141 of the top plate 140. Accordingly, the extinguisher sheet 150 may be positioned such that the openings therein correspond to the ducts 141 of the top plate 140. In addition, the extinguisher sheet 150 may be coupled to a bottom surface of the top cover 160. When the extinguisher sheet 150 is coupled to the bottom surface of the top cover 160, the extinguisher sheet 150 is positioned above the top plate 140. The configuration and operation of the extinguisher sheet 150 will be described in more detail below.

The top cover 160 is coupled to the top portion (e.g., the top surface) of the top plate 140. The top cover 160 may cover the top plate 140 and the bus bars 145. The top cover 160 also covers the extinguisher sheet 150 coupled to its bottom surface 160b, thereby protecting the top plate 140, the bus bars 145, and the extinguisher sheet 150 from external impacts applied to a top surface 160a of the top cover 160.

The top cover 160 may include discharge openings (e.g., discharge holes) 161 (see, e.g., FIG. 4). The discharge openings 161 may be arranged in (e.g., adjacent each other in) one direction, for example, in a length direction, of the top cover 160. In addition, the discharge openings 161 may be positioned to correspond to the ducts 141 of the top plate 140, and each of the discharge openings 161 may include (or may be) a plurality of separate openings (e.g., sub-discharge openings) spaced apart from one another. Accordingly, the gas discharged from the vent of the battery cell may be discharged outside of the energy storage module 100 along the duct 141 of the top plate 140 and through the discharge opening 161 of the top cover 160, thereby facilitating user safety by preventing the user's hand from contacting the internal structure of the top cover 160.

The top cover 160 may further include a protrusion (e.g., a protrusion part) 162 around the discharge opening 161 (e.g., around each of the discharge openings 161). The protrusion 162 may protrude from the bottom surface 160b of the top cover 160 to be coupled to (e.g., to extend around) the exterior side (or exterior surface) of the duct 141. The protrusion 162 may have a shape that corresponds to the cross-sectional shape of the duct 141.

Hereinafter, the duct 141 of the top plate 140 according to an embodiment of the present disclosure will be described in more detail.

Figure 5A:
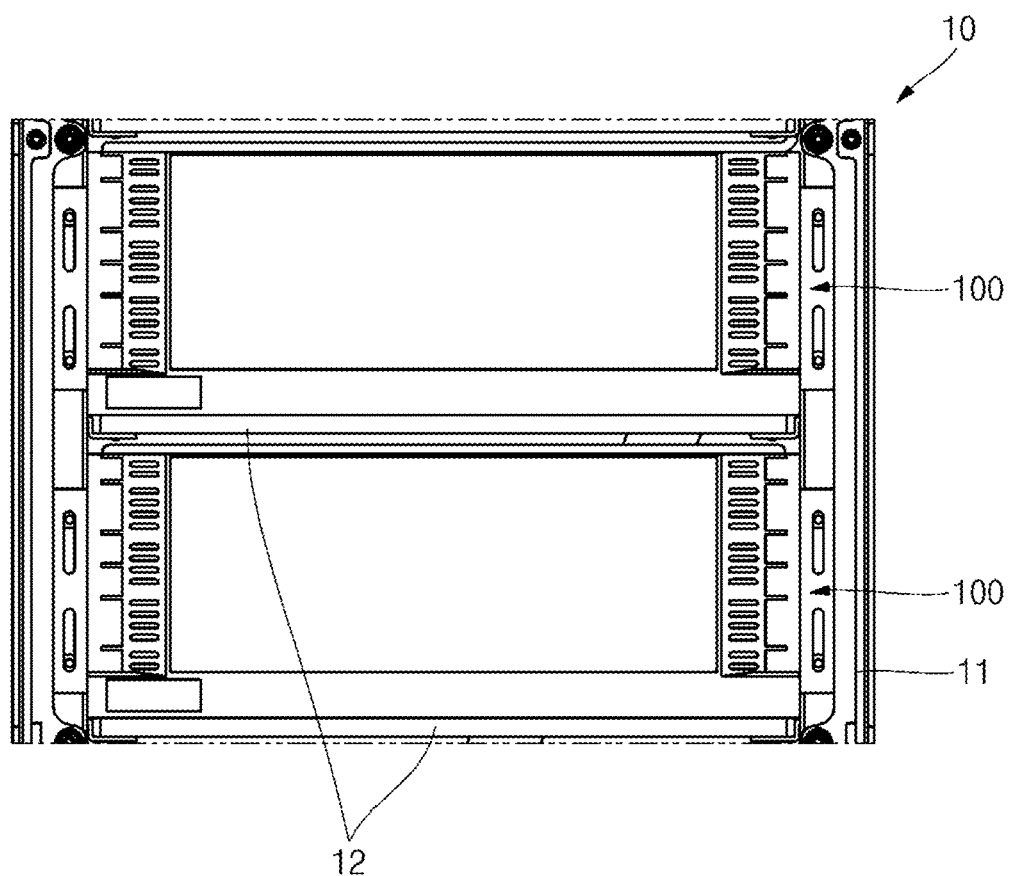
FIG. 5A shows a plurality of energy storage modules coupled to a rack according to an embodiment of the present disclosure.
Figure 5B:
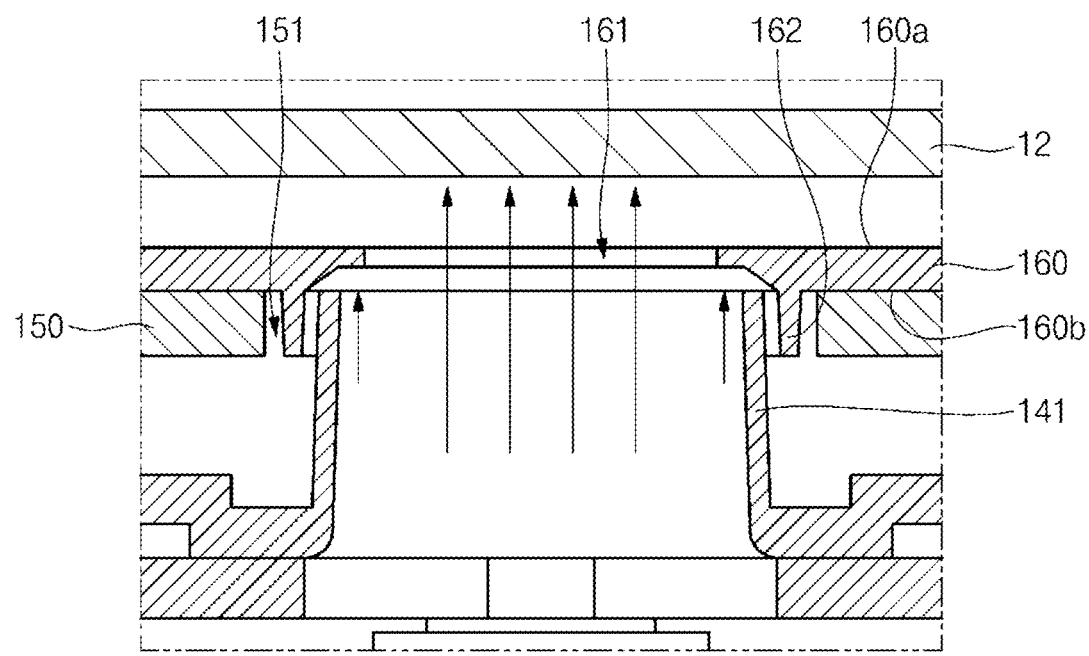
FIGS. 5B and 5C illustrate gas movement from a battery cell through a duct in the energy storage module shown in FIGS. 1-4.
Figure 5C:
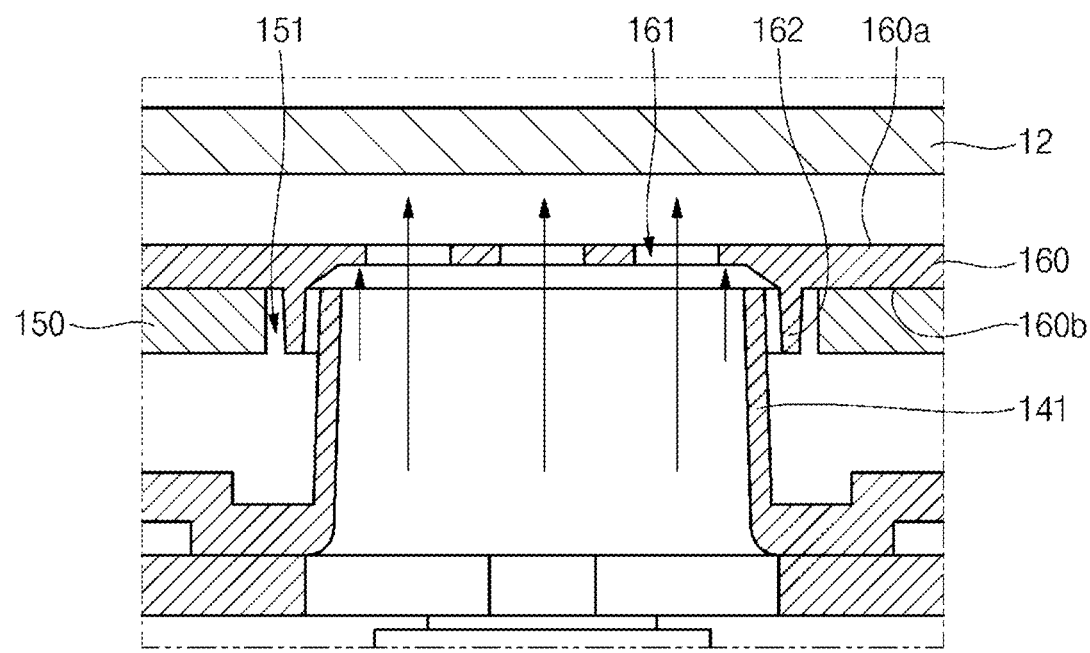

FIG. 5A shows energy storage modules that are coupled to a rack according to an embodiment of the present disclosure, and FIGS. 5B and 5C illustrate gas movement from a vent of a battery cell through one of the ducts 141 in the energy storage module 100 according to an embodiment of the present disclosure. Specifically, FIG. 5B is a cross-sectional view of the energy storage module 100 along a first direction, and FIG. 5C is a cross-sectional view thereof along a second direction perpendicular to the first direction.

Referring to FIG. 5A, according to an embodiment of the present disclosure, a plurality of energy storage modules 100 may be combined with (e.g., coupled to) a rack 10. The number of energy storage modules 100 may vary according to the desired capacity, and the energy storage modules 100 may be mounted in the rack 10 and then be fixed thereto. The rack 10 may include a frame 11 defining its overall external shape and shelves 12 located at different layers (or levels) in the frame 11. The shelves 12 may support bottom portions (or bottom surfaces) of the energy storage modules 100 (e.g., the energy storage modules 100 may be placed on or mounted on the shelves 12). In FIG. 5A, two shelves 12 are shown in the frame 11, and two energy storage modules 100 are shown mounted on the respective shelves 12. The present disclosure, however, is not limited to the number of shelves 12 and energy storage modules 100 in the illustrated embodiment.

As described above, the ducts 141 of the top plate 140 are located to correspond to the vents of the battery cells. Referring to FIGS. 5A-5C, the gas discharged from the vent may move upwardly along (or through) the duct 141, as indicated by the arrows, and through the corresponding one of the discharge openings 161 in the top cover 160. The top plate 140 may face toward (e.g., the duct 141 may extend toward and may be aligned with) the discharge opening 161 of the top cover 160 positioned above the duct 141 such that the gas discharged from the vent passes through the discharge opening 161 (e.g., the duct 141 may be in fluid communication with the discharge opening 161 of the top cover 160). Here, the shelf 12 of the rack 10 is positioned above the top surface 160a of the top cover 160 so the gas is between (e.g., enter the space between) the top surface 160a of the top cover 160 and the adjacent shelf 12. A distance between the top surface 160a of the top cover 160 and the shelf 12 may be in a range from about 3 mm to about 7 mm. When the distance is greater than or equal to about 3 mm, the heat generated by the energy storage module 100 can be easily discharged to the exterior and, when the distance is less than about 7 mm, a high-temperature inert gas atmosphere can be easily created therein, which will be described in more detail below.

When gas is discharged through the vent of the battery cell, initially, combustible gas of an electrolyte vapor component having a relatively low temperature of about 170° C. is primarily generated and, at later stages (e.g., at a later time), inert gas having a relatively high temperature of about 400° C. is gradually generated. In addition, when the relatively low temperature gas is generated, heat-resistant plastic materials of the top plate 140 and the top cover 160 may contain the gas without melting. But if a separator in an electrode assembly of the battery cell melts due to a rise in the internal temperature of the battery cell, the high-temperature inert gas may be generated along with flames. As described above, the inert gas may fill spaces between the top surface 160a of the top cover 160 and the adjacent shelf 12 to create an inert gas atmosphere. Accordingly, oxygen induction can be prevented and the flames generated by the battery cell can be blocked (or extinguished). In addition, the extinguisher sheet 150 positioned under the top cover 160 may operate (e.g., may emit a fire extinguishing agent) due to the high-temperature inert gas, thereby allowing the fire extinguishing agent to be sprayed (or emitted), which will be described later in more detail.

Hereinafter, the configuration and operation of the extinguisher sheet 150 of the energy storage module 100 according to an embodiment of the present disclosure will be described in more detail.

Figure 6:
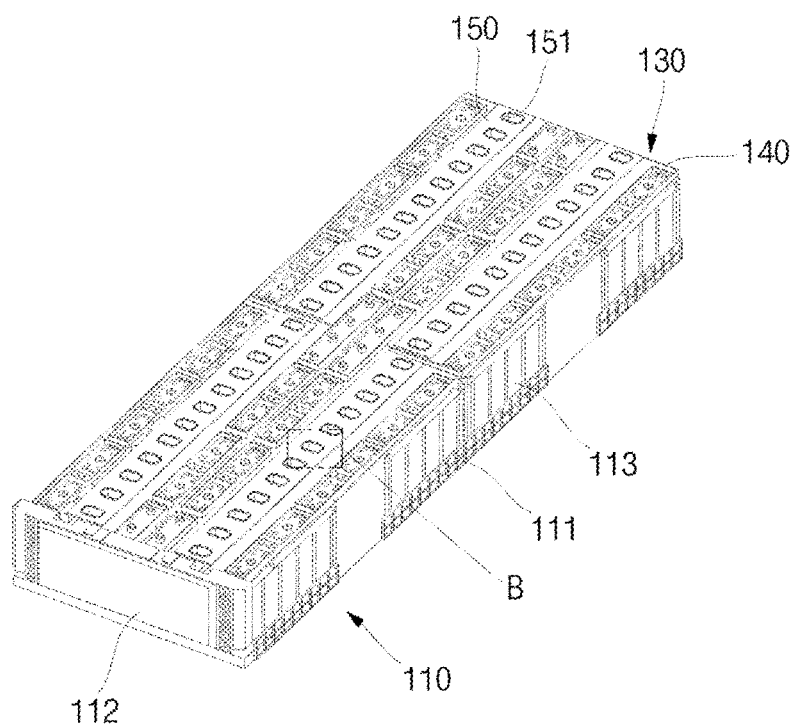
FIG. 6 is a perspective view of the extinguisher sheet coupled to a top plate of the energy storage module shown in FIGS. 1-4.
Figure 7:
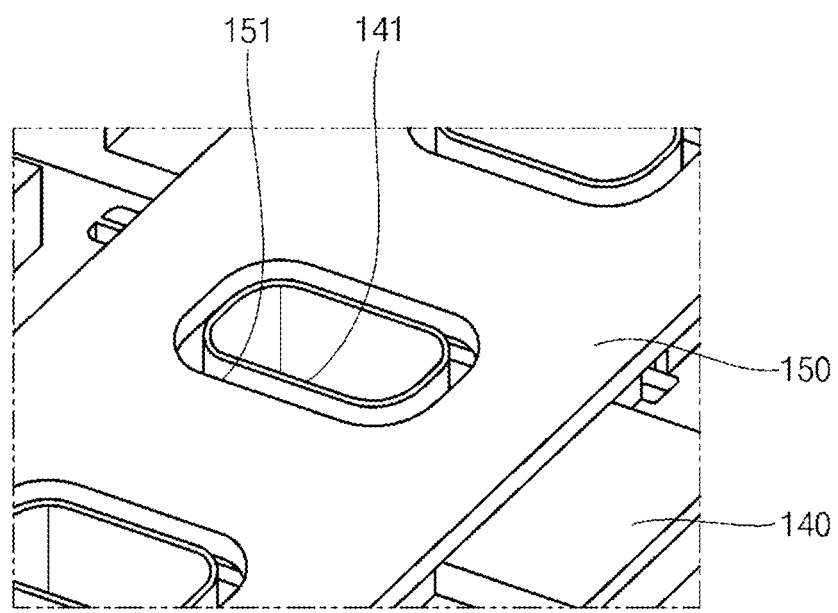
FIG. 7 is a partially enlarged view of the portion B of FIG. 6.
Figure 8A:
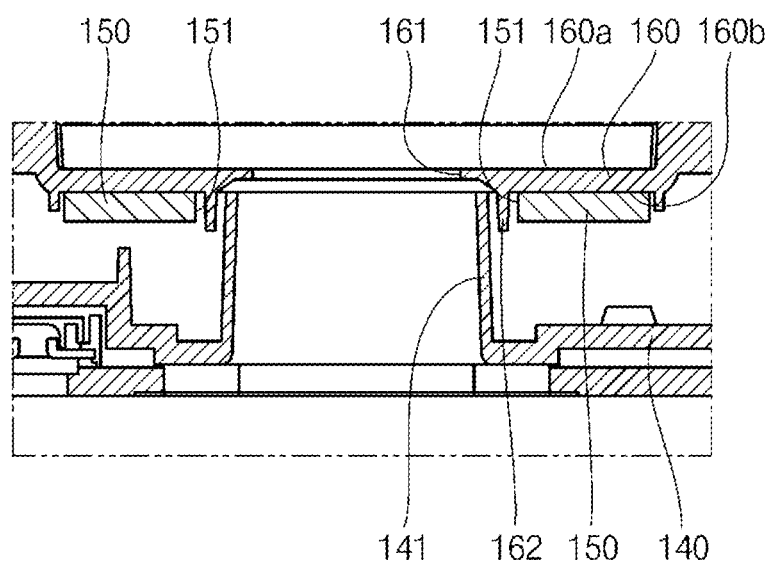
FIGS. 8A and 8B illustrate the extinguisher sheet in the energy storage module according to an embodiment of the present disclosure.
Figure 8B:
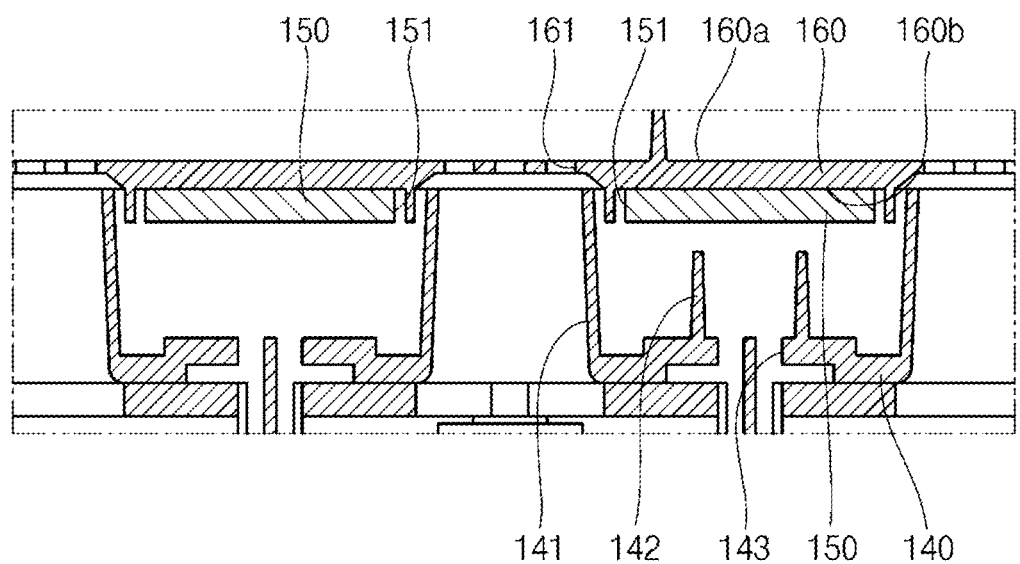

FIG. 6 is a perspective view of an energy storage module according to an embodiment of the present disclosure in which the extinguisher sheet is coupled to the top plate, and FIG. 7 is a partially enlarged view of the portion B of FIG. 6. FIGS. 8A and 8B are cross-sectional views of the energy storage module according to an embodiment of the present disclosure. FIGS. 9A-9D are cross-sectional views of example configurations of the extinguisher sheet according to embodiments of the present disclosure.

Referring to FIGS. 6 and 7, the extinguisher sheet 150 may be positioned between the top plate 140 and the top cover 160, as described above. As shown in FIG. 6, the extinguisher sheet 150 may have openings (e.g., opening holes) 151 corresponding to the ducts 141 of the top plate 140 and the discharge openings 161 of the top plate 160. Accordingly, movement of the gas through the ducts 141 may not be influenced by the extinguisher sheet 150 (e.g., the extinguisher sheet 150 may not impede the movement of the gas from the battery cells). In other words, the ducts 141 may be in fluid communication with corresponding ones of the discharge openings 161 through (or in) the corresponding openings 151 of the extinguisher sheet 150.

In addition, referring to FIGS. 8A and 8B, the extinguisher sheet 150 may operate (e.g., may emit a fire extinguishing agent) in response to heat when the inert gas having a relatively high temperature of, for example, about 400° C., is generated. Here, the fire extinguishing agent contained in the extinguisher sheet 150 is sprayed (or emitted) from the extinguisher sheet 150 due to (or in response to) the high-temperature gas. In addition, because a top portion of the extinguisher sheet 150 is covered by the top cover 160, the fire extinguishing agent may be sprayed toward (e.g., emitted or directed toward) the top plate 140 and the battery cells with directionality. In addition, the fire extinguishing agent may reach the underlying insulation spacers through openings (e.g., opening holes) 143 located at front and rear sides of the ducts 141 (e.g., located between the ducts 141) of the top plate 140. In some embodiments, a fluid guide protrusion 142 may be provided around the opening 143 (e.g., around each of the openings) of top plate 140, thereby more efficiently guiding movement of the fire extinguishing agent. As will be described in more detail below, after reaching the insulation spacers, the fire extinguishing agent may move along surfaces of the insulation spacers, thereby extinguishing the adjacent battery cell(s) and cooling the battery cell(s).

Figure 9A:
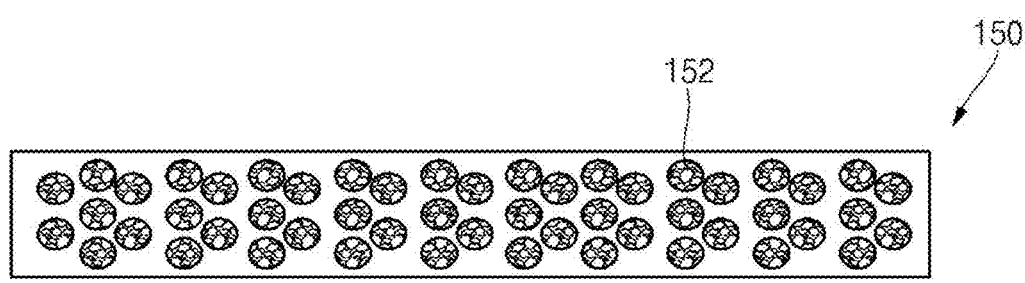
FIGS. 9A-9D are cross-sectional views of extinguisher sheets according to embodiments of the present disclosure.

The extinguisher sheet 150 may be configured as shown in FIGS. 9A-9D. For example, as shown in FIG. 9A, the extinguisher sheet 150 may include a receiving space (or a plurality of receiving spaces) 152 containing a fire extinguishing agent within an outer cover including (or made of) polyurea or polyurethane.

The receiving space 152 may include a micro-sized fire extinguishing capsule(s) covering (or encapsulating) the fire extinguishing agent therein. The fire extinguishing agent may include, for example, halogenated carbon, such as a halogenated ketone. In some embodiments, the fire extinguishing capsule(s) defining the receiving space 152 may be configured to open (or burst) to spray the fire extinguishing agent when the gas having passed through the duct 141 reach a relatively high temperature of about 400° C. For example, the fire extinguishing agent may start to experience a phase change at about 50° C. In a high temperature atmosphere of, for example, about 400° C., the fire extinguishing capsule(s) opens (or bursts) due to increased internal pressure due to the phase change, causing the internal fire extinguishing agent to be sprayed. In addition, the fire extinguishing capsule may also melt at a temperature of about 400° C., thereby allowing the internal fire extinguishing agent to be sprayed (or emitted).

A proportion of the fire extinguishing agent contained in the extinguisher sheet 150 to the overall weight of the fire extinguishing sheet may be in a range from about 30% to about 50%. When the proportion of the fire extinguishing agent is greater than or equal to about 30%, the battery cell(s) can be appropriately extinguished by the extinguisher sheet 150 and, when the proportion of the fire extinguishing agent is less than or equal to about 50%, the extinguisher sheet 150 can be easily set (or configured) to operate at a temperature of about 400° C.

In addition, the fire extinguishing agent may be contained in the extinguisher sheet 150 in an amount between about 0.12 g/cm$^3$ to about 0.82 g/cm$^3$. When the amount of the fire extinguishing agent is greater than about 0.12 g/cm$^3$, the extinguisher sheet 150 can appropriately extinguish the battery cell(s) by considering the capacity of the battery cell(s) used in the energy storage module 100 including the extinguisher sheet 150 and, when the amount of the fire extinguishing agent is less than or equal to about 0.82 g/cm$^3$, the extinguisher sheet 150 can be easily set (or configured) to operate at a temperature of about 400° C.

Figure 9B:
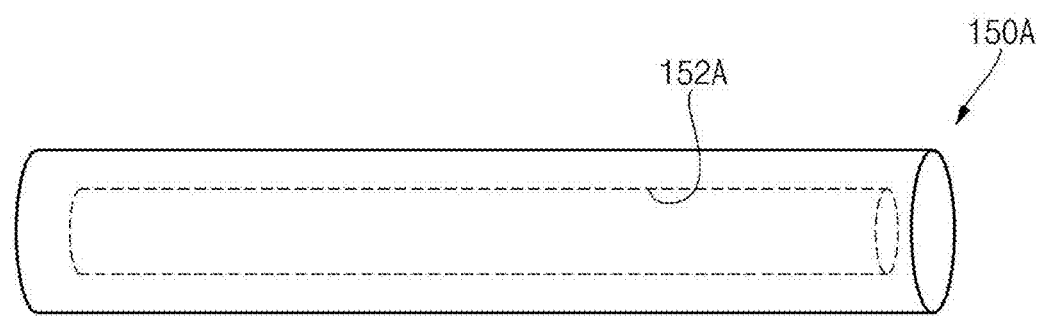

As shown in FIG. 9B, another example extinguisher sheet 150A may include an internal tube-type (e.g., cylindrical) receiving space 152A, which receives (or accommodates or stores) a fire extinguishing agent within the extinguisher sheet 150A.

Figure 9C:
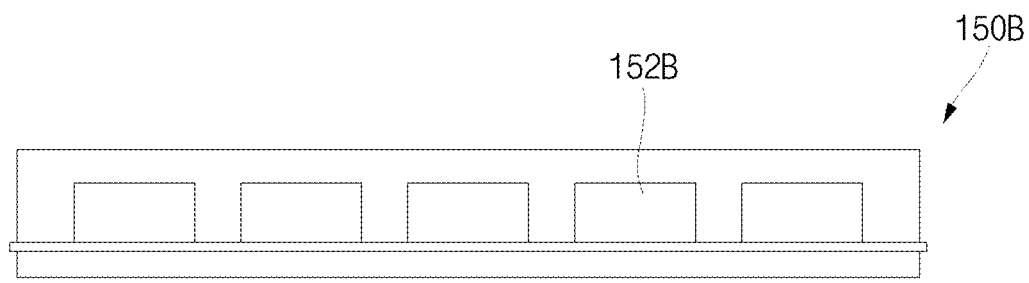

As shown in FIG. 9C, another example extinguisher sheet 150B may include receiving spaces 152B arranged therein and spaced apart from one another (e.g., spaced apart from each other at a regular interval). In this embodiment, the fire extinguishing sheet includes a plurality of receiving spaces 152B that are spaced apart from one another, different from the tube-type receiving space 152A in the extinguishing sheet 150A described above. The receiving spaces 152B of the extinguisher sheet 150B may operate (e.g., may emit or spray the fire extinguishing agent) in response to high-temperature internal gas from the battery cells. Therefore, when gas is generated by one or more of the battery cells, the extinguisher sheet 150B may emit (or spray) the first extinguishing agent from the receiving spaces 152B corresponding to (e.g., arranged over or near) the battery cells that vent the high-temperature gas.

Figure 9D:
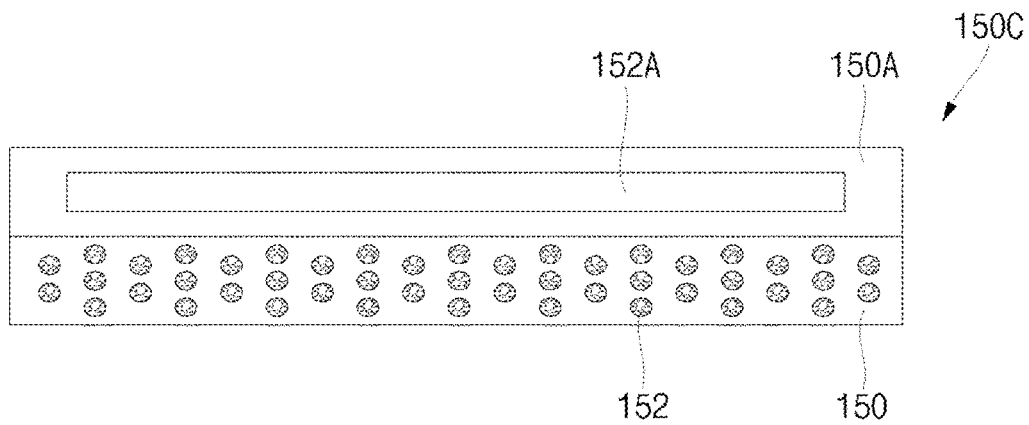

In addition, as shown in FIG. 9D, another example extinguisher sheet 150C may have a multi-layer structure including a plurality of layers (or sheets). For example, the extinguisher sheet 150C may include a first extinguisher sheet 150 having lower capsule-type receiving spaces 152 and a second extinguisher sheet 150A having an upper tube-type receiving space 152A. In this embodiment, the first extinguisher sheet 150 and the second extinguisher sheet 150A may have different operating temperatures, thereby allowing the first extinguisher sheet 150 and the second extinguisher sheet 150A to sequentially operate according to the temperature and amount of the vented gas. In addition, according to the duplex operation of the extinguisher sheet 150C, the extinguisher sheet 150C may sequentially operate according to the temperature and generation time (e.g., the continued generation) of gas, thereby constantly (e.g., constantly over a period of time) spraying the fire extinguishing agent.

Hereinafter, configurations and operations of the battery cells and the insulation spacers in the energy storage module 100 according to an embodiment of the present disclosure will be described.

Figure 10:
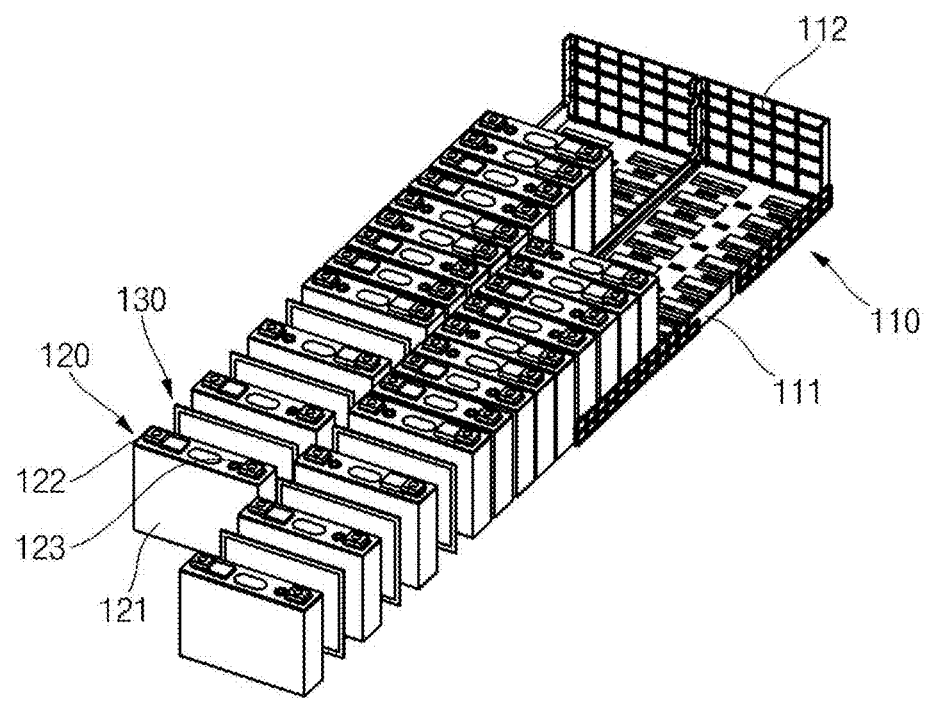
FIG. 10 is a perspective view of battery cells and insulation spacers arranged on a bottom plate of the energy storage module according to an embodiment of the present disclosure.
Figure 11:
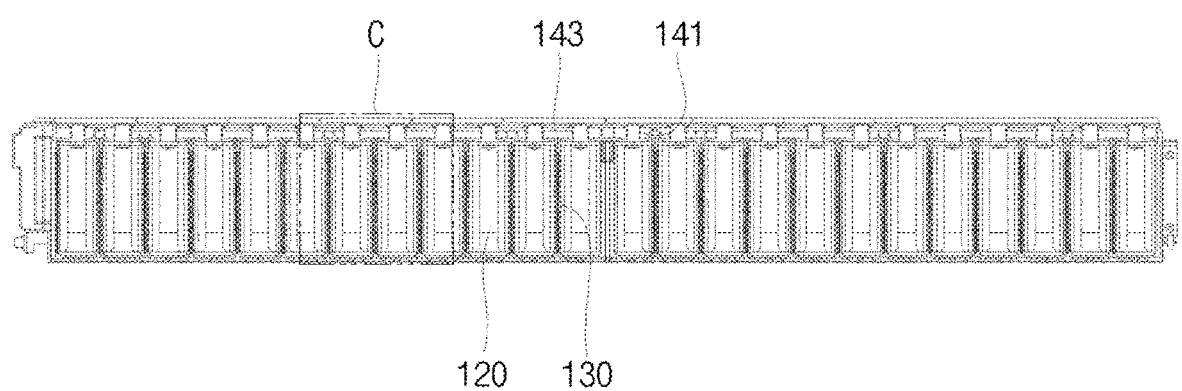
FIG. 11 is a cross-sectional view taken along the line 11-11' of FIG. 1.
Figure 12:
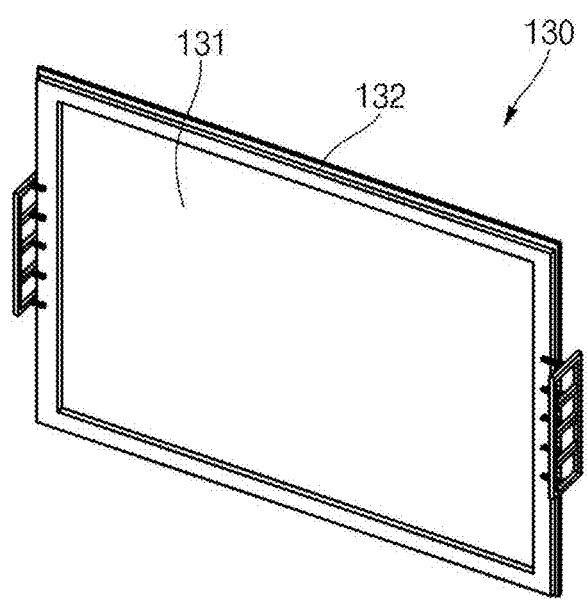
FIG. 12 is a perspective view illustrating one of the insulation spacers in the energy storage module according to an embodiment of the present disclosure.
Figure 13:
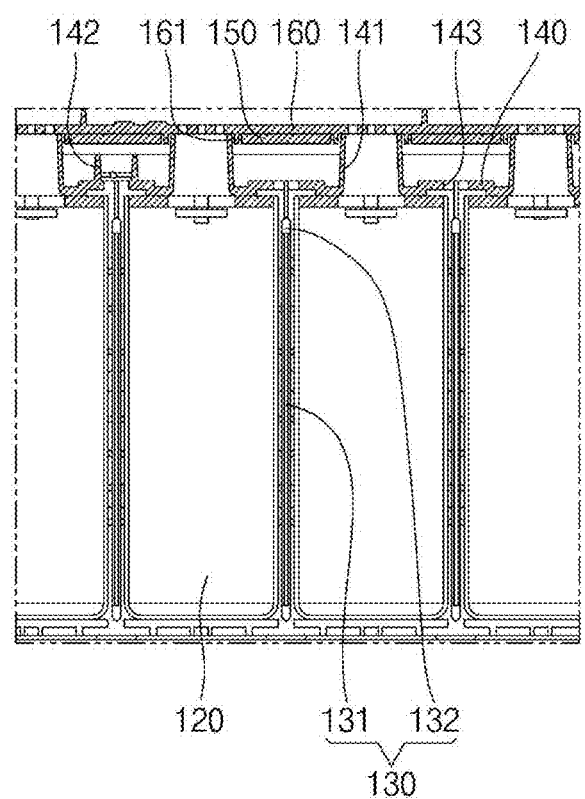
FIG. 13 is a partially enlarged view of the portion C of FIG. 11.

FIG. 10 illustrates battery cells 120 and insulation spacers 130 arranged on the bottom plate 111 of the energy storage module 100 according to an embodiment of the present disclosure. FIG. 11 is a cross-sectional view taken along the line 11-11' of FIG. 1. FIG. 12 is a perspective view of one of the insulation spacers 130 according to an embodiment of the present disclosure. FIG. 13 is a partially enlarged view of the portion C of FIG. 11.

Referring to FIG. 10, the battery cells 120 and insulation spacers 130 may be alternately arranged on a top surface of the bottom plate 111 of the cover member 110. For example, the battery cells 120 may be arranged in two columns along the top surface of the bottom plate 111, and one of the insulation spacers 130 may be positioned between each of (e.g., between adjacent ones of) the battery cells 120.

Each of the battery cells 120 may include an electrode assembly accommodated within a case 121, and the electrode assembly may be wound, stacked, or laminated in a state in which a separator is positioned between a positive electrode plate and a negative electrode plate. Each of the positive and negative electrode plates include an active material coated on a region (e.g., a coated portion or coated region). The battery cells 120 may further include electrode terminals 122 and 123, which are electrically connected to regions of the positive and negative electrode plates that are not coated with the active material (e.g., uncoated portions or uncoated regions). The electrode terminals 122 and 123 may be exposed to (e.g., may extend through or above) an upper portion of the case 121. The electrode terminals 122 and 123 may be referred to as a first electrode terminal 122 and a second electrode terminal 123, respectively defining, for example, a negative electrode terminal and a positive electrode terminal, but the polarities of the electrode terminals 122 and 123 may be reversed. Occurrences of battery cell ignition can be reduced according to the compositions of the active materials of the battery cells 120, thereby increasing safety of the battery cells 120. The active material compositions will be described in more detail below.

Referring to FIG. 11, the insulation spacers 130 positioned between each of the battery cells 120 may prevent the battery cells 120 from contacting each other. In addition, the insulation spacers 130 may maintain distance (e.g., may maintain a space) between each of the battery cells 120 to establish passages for external air, thereby cooling the battery cells 120.

Referring to FIG. 12, each of the insulation spacers 130 may include a sheet (e.g., a sheet part) 131 and an edge (e.g., an edge part) 132. The sheet 131 may be (may include or employ) a mixture of a flame-retardant (e.g., a non-combustible) sheet that prevents or slows a fire from spreading to neighboring battery cells 120 a heat-insulating sheet that prevents or reduces heat from spreading to neighboring battery cells 120. For example, MICA may be used as the flame-retardant sheet, and ceramic paper including (or represented by) a bio-soluble fiber containing an alkaline earth metal may be used as the non-combustible sheet, but aspects of the present disclosure are not limited thereto.

In addition, the edge 132 may be provided along peripheral edges of the sheet 131. The edge 132 may include (or may be made of) a plastic material and may be coupled to edges of the sheet 131 by a double injection process to fix the shape of the sheet 131. The edge 132 may include (or may be made of), for example, polyethylene or polypropylene.

As described above, when a fire extinguishing agent is injected from above the insulation spacers 130, the fire extinguishing agent may move downwardly along the surface of the sheet 131. Therefore, the fire extinguishing agent may contact the cases 121 of the battery cells 120, thereby extinguishing any fire and cooling the battery cells 120. Hereinafter, movement of the fire extinguishing agent will be described in greater detail.

As shown in FIG. 13, the openings 143 of the top plate 140 are located to correspond to (e.g., arranged above) the insulation spacers 130. Accordingly, the fire extinguishing agent emitted by the extinguisher sheet 150 may pass through the openings 143 of the top plate 140 to reach the insulation spacers 130. In addition, the fire extinguishing agent may move along surfaces of the insulation spacers 130 that face the cases 121 of the battery cells 120, thereby both extinguishing any fire and cooling the battery cells 120.

The fire extinguishing agent is sprayed from (e.g., is emitted or sprayed from a portion of) the extinguisher sheet 150 that is above (e.g., adjacent to or corresponding to) of the battery cell(s) 120 that has a temperature that is higher than a reference temperature. Therefore, the fire extinguishing agent may be sprayed from a top portion of (e.g., above) the battery cell(s) 120 that has an elevated temperature. In addition, because the fire extinguishing agent moves along the surfaces of the insulation spacers 130 positioned at front and rear sides of the corresponding battery cell 120, the extinguishing and cooling operations of the corresponding battery cell 120 can both be performed.

Hereinafter, a configuration of an energy storage module according to another embodiment of the present disclosure will be described.

Figure 16:
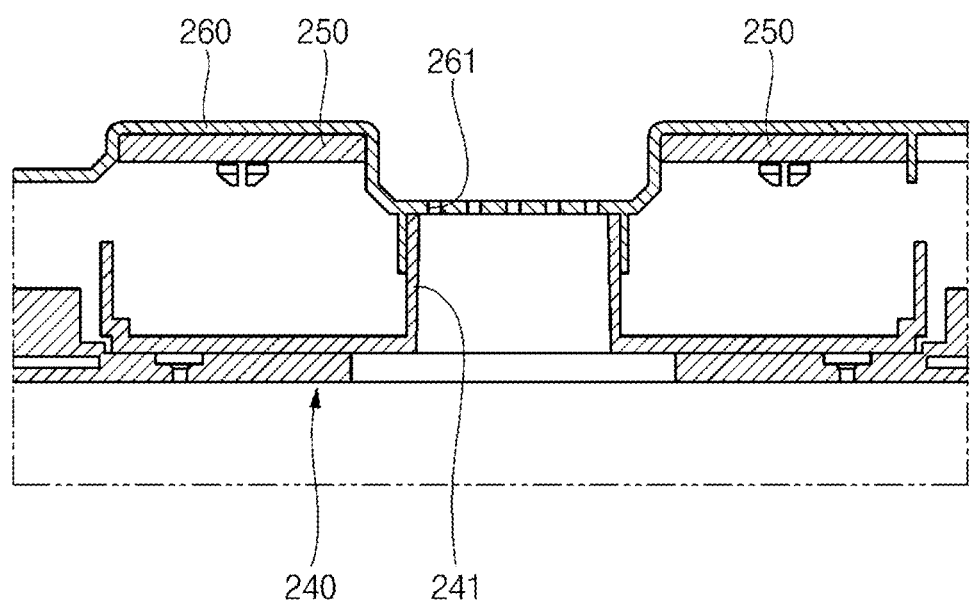
FIG. 16 is a cross-sectional view of a part of the energy storage module shown in FIGS. 14 and 15.

FIG. 14 is a perspective view of an energy storage module according to another embodiment of the present disclosure, FIG. 15 is a plan view showing an extinguisher sheet that is coupled to a top plate in the energy storage module shown in FIG. 14, and FIG. 16 is a partial cross-sectional view of the energy storage module shown in FIGS. 14 and 15.

Referring to FIGS. 14-16, an energy storage module 200 according to another embodiment of the present disclosure may include a cover member 210, a top plate 240, an extinguisher sheet 250, and a top cover 260.

The cover member 210, the top plate 240, the extinguisher sheet 250, and the top cover 260 may be similar to those of the energy storage module 100 described above.

However, when the top cover 260 is coupled to a duct 241 positioned at an area of the top plate 240 corresponding to the vent of the battery cell, and a portion of the top cover 260 that corresponds to the duct 241 (e.g., a portion of the top cover 260 at where the openings 261 are arranged) may be lower (e.g., nearer to the battery cells) than other portions of the top cover 260. In this embodiment, gas emitted through the vent may gather at a top portion (e.g., at an upper or outer surface) of the top cover 260 corresponding to the duct 241. The gathered gas may be discharged to the exterior by using a separate fan or a suction (e.g., vacuum) component, thereby allowing the gas generated by the battery cell to be discharged quickly.

Hereinafter, the active material composition of the battery cell 120 used in the energy storage module 100 according to an embodiment of the present disclosure will be described in greater detail.

Figure 17A:
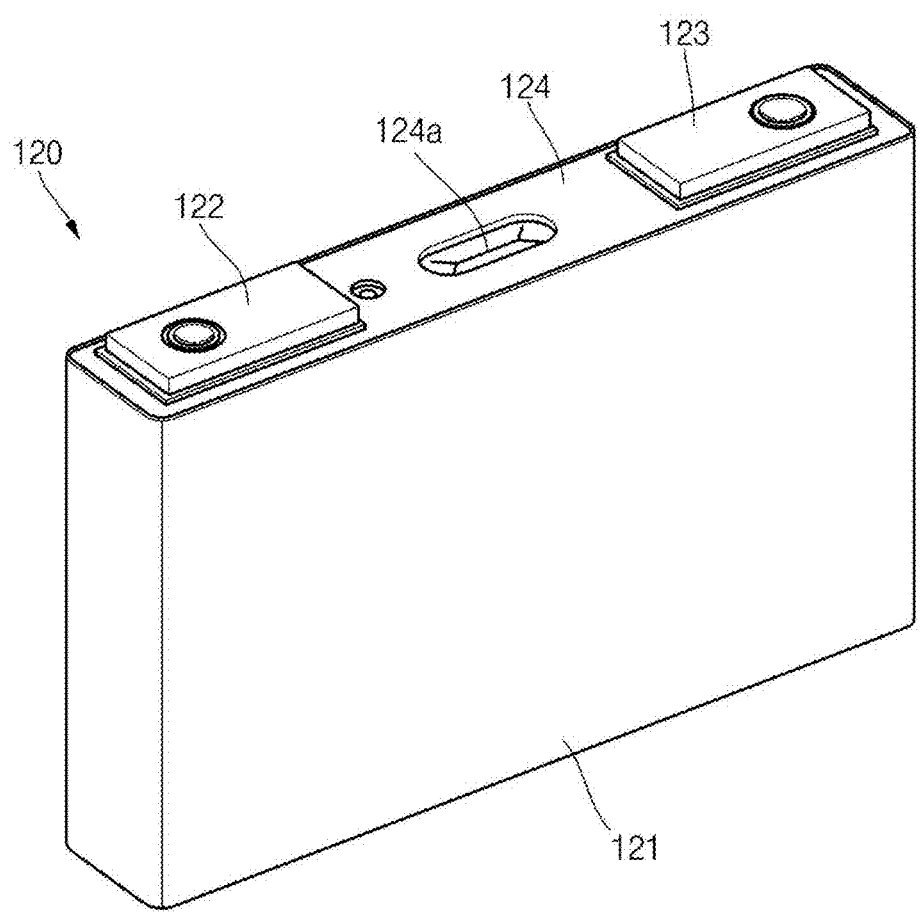
FIGS. 17A and 17B are a perspective view and a cross-sectional view, respectively, of a battery cell of an energy storage module according to an embodiment of the present disclosure.
Figure 17B:
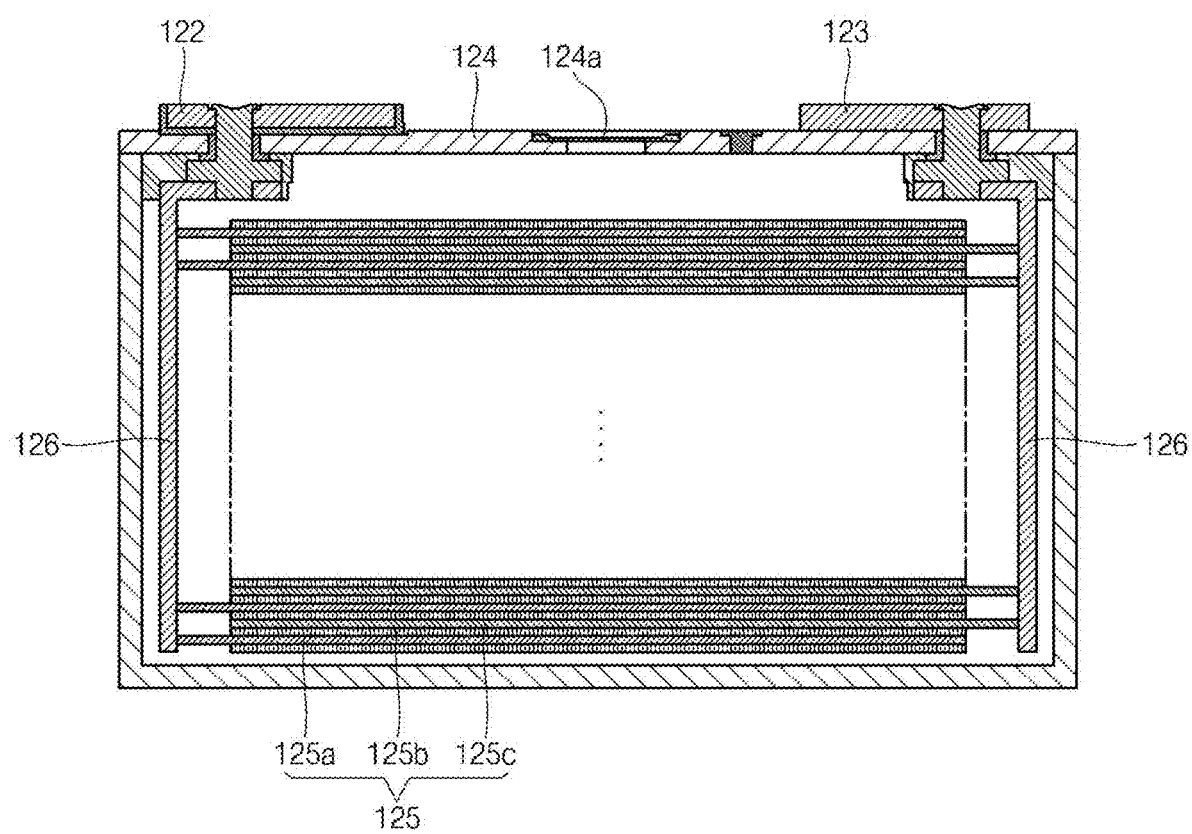

FIGS. 17A and 17B are a perspective view and a cross-sectional view of a battery cell used in an energy storage module according to an embodiment of the present disclosure.

Referring to FIGS. 17A and 17B, a battery cell 120 is configured such that an electrode assembly 125 is accommodated in a case 121 and a cap plate 124 covers a top portion of the case 121. In addition, a vent 124a having a smaller thickness than other regions is located roughly at the center of the cap plate 124. A duct 141 of the top plate 140 is located to correspond to a top portion of a vent 124a, as described above.

In addition, the electrode assembly 125 may be electrically connected to a first electrode terminal 122 and a second electrode terminal 123 located on the cap plate 124 through a pair of current collectors 126. For convenience sake, in the following description, the first electrode terminal 122 will be referred to as a negative electrode terminal and the second electrode terminal 123 will be referred to as a positive electrode terminal, but polarities thereof may also be reversed.

The electrode assembly 125 may include a negative electrode 125a, a positive electrode 125b positioned to face the negative electrode 125a and a separator 125c positioned between the negative electrode 125a and the positive electrode 125b, and the electrode assembly 125 may be accommodated in the case 121 together with an electrolyte.

Here, the negative electrode 125a may include a negative electrode current collector, a negative electrode active material layer positioned on the negative electrode current collector, and a negative electrode function layer positioned on the negative electrode active material layer.

Compared to a case where the negative electrode function layer includes spherical polyethylene particles, in a case where the negative electrode function layer includes flake-shaped polyethylene particles, the reaction depending on the temperature may speed up under the same reaction conditions, thereby further increasing a safety improving effect of a lithium secondary battery.

The flake-shaped polyethylene particles yet to be melted may be distributed to cover pores over a thinner and wider area than the spherical polyethylene particles yet to be melted. If the polyethylene particles are melted at a temperature higher than a set or predetermined temperature to shut down ion passages, a larger electrode plate area may be shut down by the flake-shaped polyethylene particles than by the melted spherical polyethylene particles, thereby increasing the reaction speed.

That is to say, during thermal runaway of a battery cell, the polyethylene particles included in the negative electrode function layer are melted to shut down ion passages, so that ion movement is restricted and a shut-down function is manifested, thereby preventing additional electrochemical reactions from taking place (or reducing a likelihood or degree of the additional electrochemical reactions).

Figure 20:
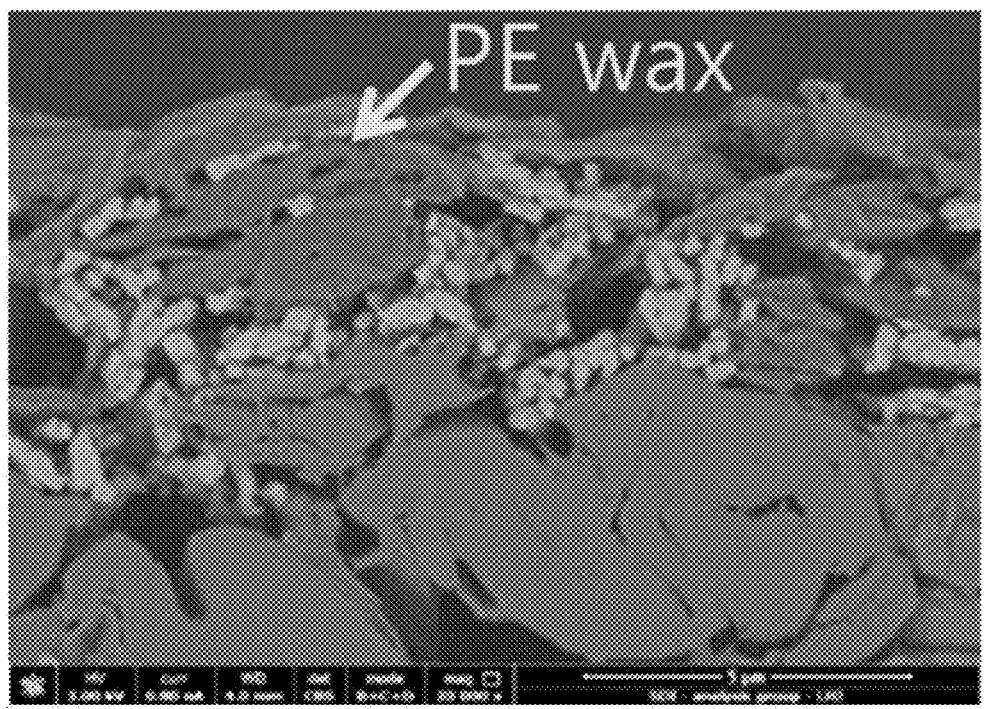
FIG. 20 is a SEM image of an electrode composition according to an embodiment of the present disclosure.
Figure 21:
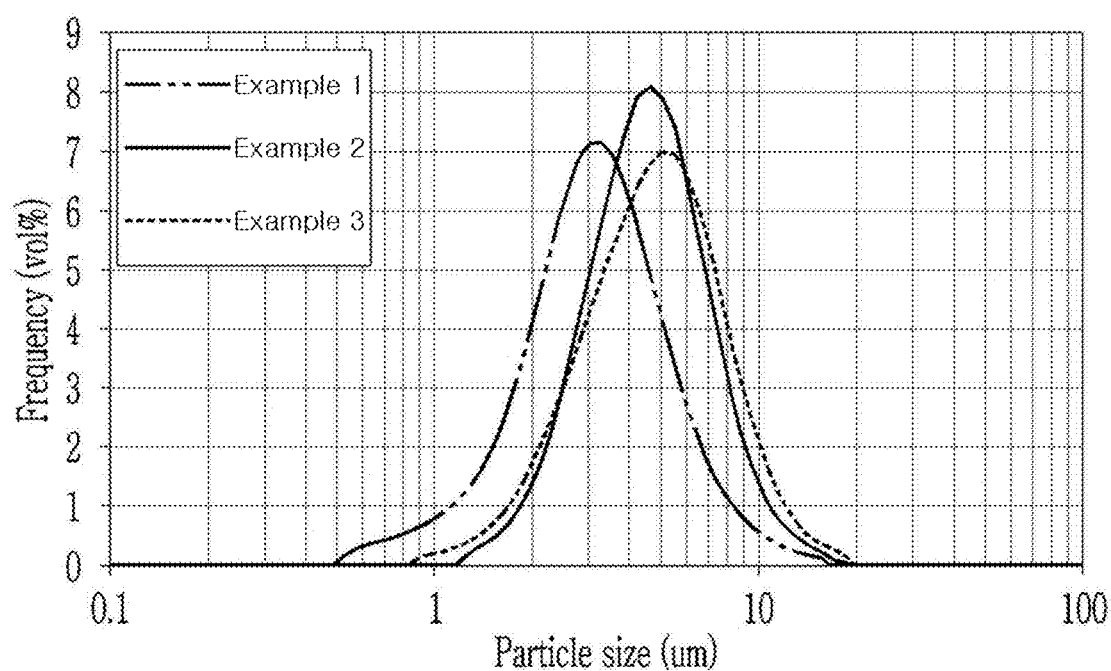
FIG. 21 is a graph showing particle size distribution analysis results of flake-shaped polyethylene particles contained in electrode compositions prepared according to Examples 1 to 3.

For example, as confirmed from FIG. 20, since the flake-shaped polyethylene particles according to an embodiment of the present disclosure are distributed over pores in the composition of the negative electrode function layer throughout a thin and wide area, they are quickly melted down during thermal runaway due to thermal/physical impacts, thereby demonstrating an excellent effect in blocking ion passages.

In general, polyethylene may be categorized by density into high-density polyethylene (HDPE) (Density: 0.94 g/cc to 0.965 g/cc), medium-density polyethylene (MDPE) (Density: 0.925 g/cc to 0.94 g/cc), low-density polyethylene (LDPE) (Density: 0.91 g/cc to 0.925 g/cc), and very low density polyethylene (VLDPE) (Density: 0.85 g/cc to 0.91 g/cc).

The flake-shaped polyethylene particles may be used alone or in mixture of two or more polyethylene (PE) polymers, such as, for example, HDPE, MDPE, or LDPE.

The flake-shaped polyethylene particles included in the negative electrode function layer positioned on the negative electrode active material layer may have an average particle diameter (D50) in a range from 1 μm to 8 μm, for example, from 2 μm to 6 μm.

Unless defined otherwise in the specification of the present disclosure, an average particle diameter (D50) may be measured using any suitable method generally used in the art such as, for example, by utilizing a particle size analyzer, or by utilizing a transmission electron microscopic (TEM)

image or a scanning electron microscopic (SEM) image. Also, the D50 may be easily measured by analyzing data measured by a measuring device using a dynamic light-scattering method to count the number of particles for each particle size range and calculating an average value thereof. In some embodiments, the D50 value may correspond to a particle size at which half of the mass (or volume) of the particles have a larger particle size and the other half of the mass (or volume) of the particles have a smaller particle size.

Meanwhile, a ratio of a major axis length to a minor axis length of the flake-shaped polyethylene particles may be in a range from 1 to 5, for example, 1.1 to 4.5, or 1.2 to 3.5.

In addition, the flake-shaped polyethylene particles may have a thickness in range from 0.2 μm to 4 μm, for example, between 0.3 μm and 2.5 μm, or between 0.3 μm and 1.5 μm.

Figure 18:
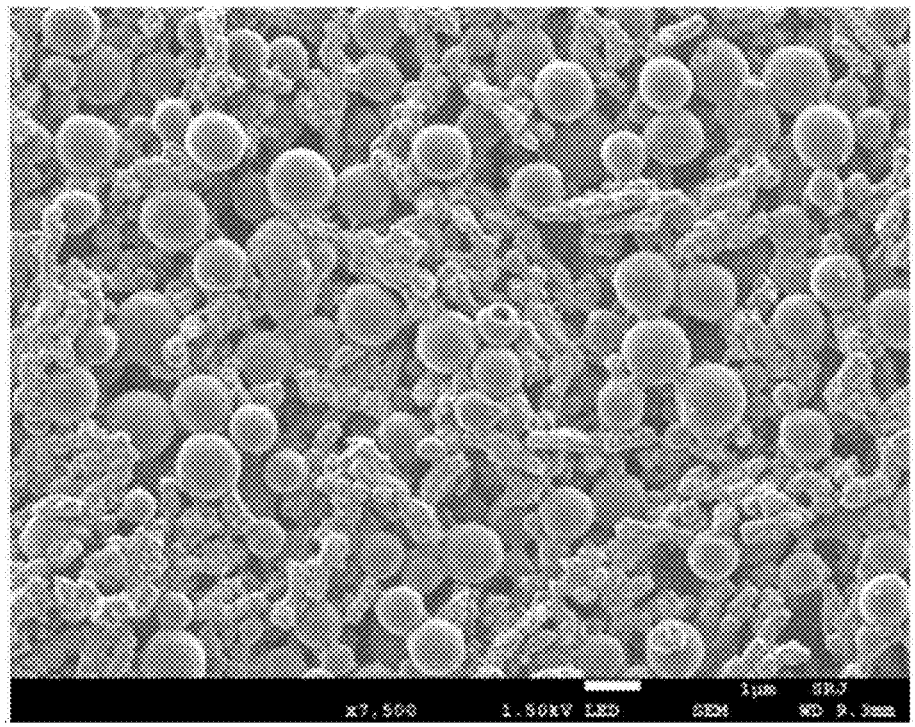
FIG. 18 is a scanning electron microscope (SEM) image of polyethylene spherical particles in an aqueous dispersion.
Figure 19:
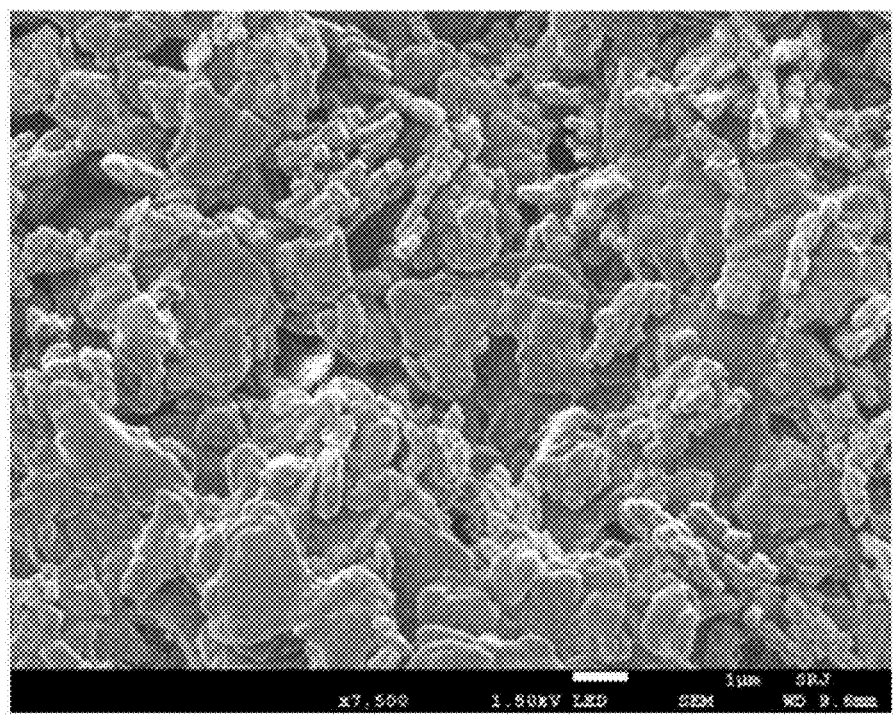
FIG. 19 is a SEM image of polyethylene spherical particles according to an embodiment of the present disclosure.

As shown in FIG. 19, the polyethylene particles according to the present disclosure have a flake-shape and have a different shape from general polyethylene particles having a spherical shape in a water-dispersible state, as shown in FIG. 18. An average particle size of the flake-shaped polyethylene particles may be defined to be D50, which is a particle size at 50% of a volume ratio (or a mass ratio) in a cumulative size-distribution curve.

The negative electrode function layer may further include inorganic particles and a binder.

The flake-shaped polyethylene particles and the inorganic particles and the binder may be contained in the negative electrode function layer in a weight ratio in a range from 80:20 to 99:1, for example, 85:15 to 97:3.

If the content (e.g., amount or weight ratio) of the flake-shaped polyethylene particles and the inorganic particles is within the range stated above, cycle-life characteristics and output power characteristics of rechargeable lithium battery cells including the same can be obtained or improved.

The inorganic particles may include, for example, $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite or combinations thereof, but aspects of the present disclosure are not limited thereto. In addition to the inorganic particles, the negative electrode function layer may further include organic particles including an acryl compound, an imide compound, an amide compound or combinations thereof, but aspects of the present disclosure are not limited thereto.

The inorganic particles may have spherical shapes, sheet-shapes, cubic shapes or amorphous shapes. An average particle diameter (e.g., D50) of the inorganic particles may be in the range from about 1 nm to about 2500 nm. Within the range stated above, the average particle diameter of the inorganic particles may be in the range from about 100 nm to about 2000 nm, or between about 200 nm and about 1000 nm, for example, between about 300 nm and about 800 nm. The average particle diameter of the inorganic particles may be a particle size (D50) at 50% of a volume ratio (or mass ratio) in a cumulative particle size-distribution curve.

The negative electrode function layer may have a thickness in the range from 1 μm to 10 μm, specifically, between 3 μm and 10 μm.

A ratio of the thickness of the negative electrode active material layer to the thickness of the negative electrode function layer may be 50:1 to 10:1, or, for example, 30:1 to 10:1.

If the thickness of the negative electrode function layer is within the foregoing range, thermal stability of the resultant rechargeable lithium battery can be remarkably improved while maintaining excellent cycle life characteristics.

In some embodiments, if the thickness ratio of the negative active material layer to the negative electrode function layer is within the range stated above, thermal stability of the resultant rechargeable lithium battery can be improved while minimizing or reducing a reduction in the energy density.

Usable examples of the negative electrode current collector may include a copper foil, a nickel foil, a stainless steel foil, a titanium foil, a nickel foam, a copper foam, a polymer substrate coated with a conductive metal, or a combination thereof.

Usable examples of the negative electrode active material may include a material capable of reversibly intercalating/deintercalating lithium ions, a lithium metal, a lithium metal alloy, a material being capable of doping/undoping lithium, or a transition metal oxide.

Examples of the material capable of reversibly intercalating and deintercalating the lithium ions may include a carbon material, e.g., any suitable carbon-based negative electrode active material generally used in a lithium secondary battery. Representative examples of the carbon-based negative electrode active material may include crystalline carbon, amorphous carbon, and mixtures thereof. Examples of the crystalline carbon may include graphite, such as amorphous, sheet-shaped, flake-shaped, spherical shaped, or fiber-shaped natural graphite or artificial graphite. Examples of the amorphous carbon may include soft carbon or hard carbon, a mesophase pitch carbonized product, fired coke, and the like.

The crystalline carbon may include non-shaped (e.g., amorphous), sheet-shaped, flake-shaped, spherical-shaped, and/or fiber-shaped natural graphite and/or artificial graphite. The amorphous carbon may be a soft carbon, a hard carbon, mesophase pitch carbide, fired coke, and/or the like.

Usable examples of the lithium metal alloy may include an alloy of lithium and a metal selected from the group consisting of Na, K, Rb, Cs, Fr, Be, Mg, Ca, Sr, Si, Sb, Pb, In, Zn, Ba, Ra, Ge, Al, and Sn.

Examples of the material being capable of doping/undoping lithium may include a silicon-based material, e.g., Si or SiOx (0<x<2), an Si-Q alloy (wherein the Q is an element selected from the group consisting of an alkali metal, an alkaline-earth metal, Group 13 to 16 elements, a transition metal, a rare earth element, or a combination thereof, and is not Si), a Si—C composite, Sn, SnO2, Sn—R (wherein the R is an element selected from the group consisting of an alkali metal, an alkaline-earth metal, Group 13 to 16 elements, a transition metal, a rare earth element, or a combination thereof, and is not Sn), a Sn—C composite, and the like, and at least one of which may be used in a mixture with $SiO_2$. Usable examples of the elements Q and R may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and combinations thereof.

The transition metal oxide may include a lithium titanium oxide.

In the negative electrode active material layer, the negative electrode active material may be included in an amount of 95 wt % to 99 wt % based on the total weight of the negative active material layer.

Optionally, the negative electrode active material layer may further include a negative electrode conductive material and a negative electrode binder.

Each of the negative electrode conductive material and the negative electrode binder may be included in an amount of 1 wt % to 5 wt % based on the total weight of the negative active material layer.

The negative electrode conductive material is used to improve the conductivity (e.g., electrical conductivity) of a negative electrode. Any suitable electrically conductive material may be used as the negative electrode conductive material, unless the material causes a chemical change (e.g., an undesirable or unwanted change to any of the components of rechargeable lithium battery). Examples of the negative electrode conductive material may include a carbon-based material, such as natural graphite, artificial graphite, carbon black, acetylene black, ketjen black, carbon fiber and the like; a metal-based material, such as a metal powder or a metal fiber and the like of copper, nickel, aluminum, silver, and the like; a conductive polymer, such as a polyphenylene derivative and the like; or a mixture thereof.

The negative electrode binder may serve to improve binding properties of the negative active material particles with one another and with a current collector. Examples of the negative electrode binder may include a non-water-soluble binder, a water-soluble binder, an amphiprotic binder, or a combination thereof.

Examples of the non-water-soluble binder may include polyvinylchloride, carboxylated polyvinylchloride, polyvinylfluoride, an ethylene oxide-containing polymer, polyvinylpyrrolidone, polyurethane, polytetrafluoroethylene, polyvinylidenfluoride, polyethylene, polypropylene, polyamideimide, polyimide, or a combination thereof.

Examples of the water-soluble binder may include a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, or a combination thereof.

Examples of the amphiprotic binder may include an acrylated styrene-based rubber.

When the water-soluble binder is used as the negative electrode binder, a cellulose-based compound may be further used to provide viscosity. Examples of the cellulose-based compound may include one or more of carboxylmethyl cellulose, hydroxypropylmethyl cellulose, methyl cellulose, or alkali metal salts thereof. The alkali metal may be Na, K, and/or Li. The cellulose-based compound may be included in an amount of 0.1 to 3 parts by weight based on 100 parts by weight of the negative electrode active material.

The positive electrode of the lithium secondary battery according to an embodiment of the present disclosure may include a positive electrode active material layer including a first positive electrode active material including at least one composite oxide of lithium and a metal of cobalt, manganese, nickel, or a combination thereof, and a second positive electrode active material including a compound represented by the Chemical Formula (1).

$LiaFe1-xMxPO4$ (1)

wherein 0.90≤a≤1.8, 0≤x≤0.7, and M is Mg, Co, Ni or combinations thereof.

Figure 25:
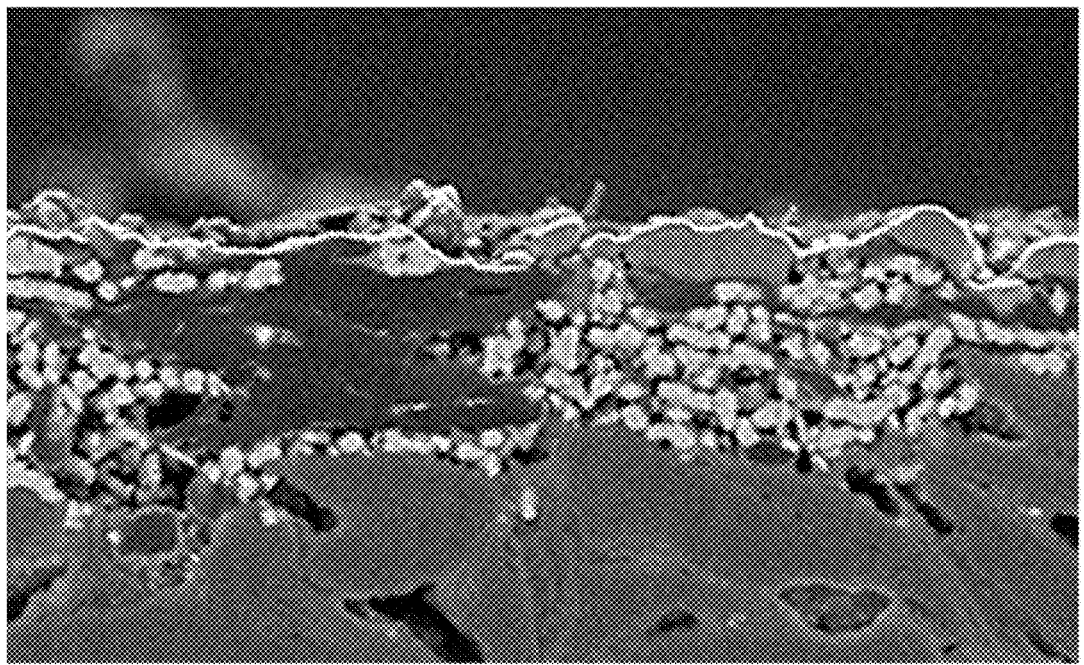
FIG. 25 is a SEM image showing a cross section of a surface of a negative electrode when a lithium secondary battery not including a positive electrode according to Example is shut down.
Figure 26:
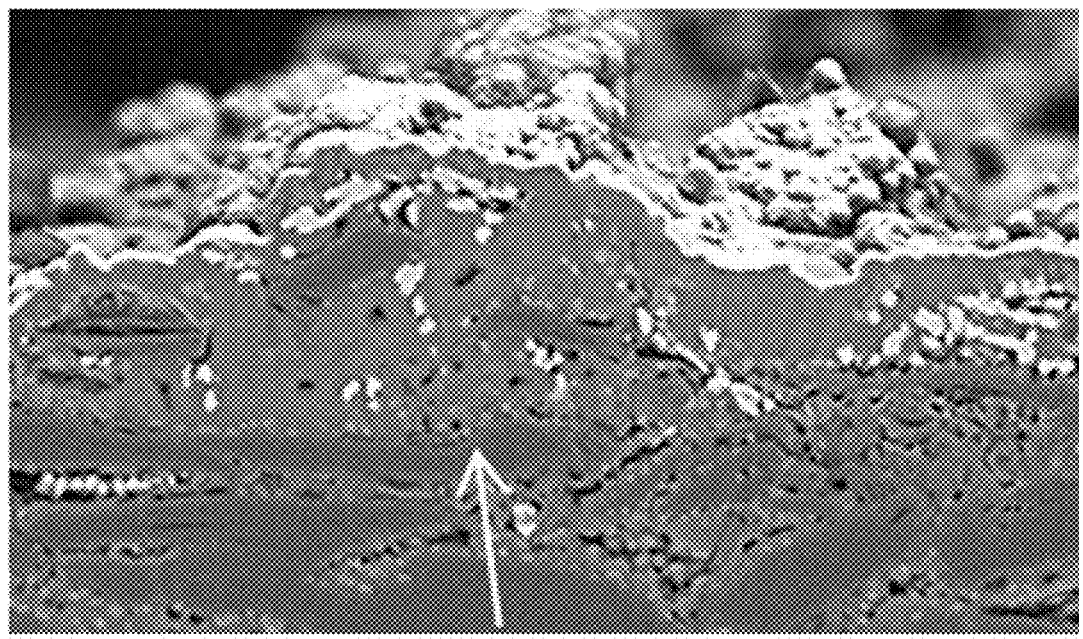
FIG. 26 is a SEM image showing a surface of a negative electrode cross section when a lithium secondary battery including both of a negative electrode with a negative electrode function layer and a positive electrode is shut down.

The lithium secondary battery according to an embodiment of the present disclosure may include both of the negative electrode function layer positioned on the negative electrode and the positive electrode active material layer including the first positive electrode active material and the second positive electrode active material, thereby reducing thermal runaway due to thermal/physical impacts and assisting the flake-shaped polyethylene particles in being melted to shut down (or perfectly shut down) ion passages. In a secondary battery not including the positive electrode according to an embodiment of the present disclosure, the ion passages may not be perfectly shut down during thermal runaway due to thermal/physical impacts (see FIG. 25). However, in a secondary battery including both of the negative electrode including the negative electrode function layer and the positive electrode according to an embodiment of the present disclosure, the ion passages can be shut down (or perfectly shut down) during thermal runaway due to thermal/physical impacts, thereby obtaining a safety maximizing or increasing effect (see FIG. 26).

Meanwhile, the positive electrode 125b may include a positive electrode current collector and a positive electrode active material layer positioned on the positive electrode current collector.

The positive electrode active material layer may include the first positive electrode active material including at least one composite oxide of lithium and a metal of cobalt, manganese, nickel, or a combination thereof, and the second positive electrode active material including a compound represented by the Chemical Formula (1).

$LiaFe1-xMxPO4$ (1)

wherein 0.90≤a≤1.8, 0≤x≤0.7, and M is Mg, Co, Ni or combinations thereof.

In addition, the positive electrode active material layer may further include a positive electrode function layer positioned on the positive electrode active material layer.

The first positive electrode active material may be at least one composite oxide of lithium and a metal of cobalt, manganese, nickel, or a combination thereof. Examples of the first positive electrode active material may include a compound represented by one of the following Chemical Formulas:

$Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0≤b≤0.5, 0≤c≤0.05); $Li_aE_{2-b}X_bO_{4-c}D_c$ (0≤b≤0.5, 0≤c≤0.05); $Li_aNi_{1-b-c}Co_bX_cD_\alpha$ (0.90≤a≤1.8, 0≤b≤0.5, 0≤c≤0.5, 0<α≤2); $Li_aNi_{1-b-c}Co_bX_cO_{2-\alpha}T_\alpha$ (0.90≤a≤1.8, 0≤b≤0.50, 0≤c≤0.05, 0<α≤2); $Li_aNi_{1-b-c}Co_bX_cO_{2-\alpha}T_2$ (0.90≤a≤1.8, 0≤b≤0.50, 0≤c≤0.05, 0<α<2); $Li_aNi_{1-b-c}Mn_bX_cD_\alpha$ (0.90≤a≤1.8, 0≤b≤0.5, 0≤c≤0.05, 0<α≤2); $Li_aNi_{1-b-c}Mn_bX_cO_{2-\alpha}T_\alpha$ (0.90≤a≤1.8, 0≤b≤ 0.50, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMn_{1-b}GbO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $QO_2$; $QS_2LiQS_2$; $V_2O_5$; $ViV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); and $Li_aFePO_4$ (0.90≤a≤1.8).

In the above chemical formulas, A is selected from the group consisting of Ni, Co, Mn, and a combination thereof; X is selected from the group consisting of Al, Ni, Co, Mn, Cr, Fe, Mg, Sr, V, a rare earth element, and a combination thereof; D is selected from the group consisting of O, F, S, P, and a combination thereof; E is selected from the group consisting of Co, Mn, and a combination thereof; T is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; Z is selected from the group consisting of Cr, V, Fe, Sc, Y, and a combination thereof; and J is selected from the group consisting of V, Cr, Mn, Co, Ni, Cu, and a combination thereof.

Here, the compounds may have a coating layer on the surface, or may be mixed with another compound having a coating layer. The coating layer may include at least one coating element compound selected from the group of an oxide of the coating element, a hydroxide of the coating element, an oxyhydroxide of the coating element, an oxycarbonate of the coating element, and a hydroxyl carbonate of the coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be formed by any suitable coating method (for example, spray coating or dipping) that demonstrates no adverse influence (or substantially no adverse influence) on properties of the positive electrode active material by using these elements in the compound, which will be well understood by one skilled in the art and further description thereof is not necessary here.

In an embodiment, the first positive electrode active material and the second positive electrode active material may be included in a weight ratio in a range from 97:3 to 80:20, for example, 95:5 to 85:15.

The first positive electrode active material may be included in an amount in a range from 70 wt % to 99 wt % based on the total weight of the positive electrode active material layer, for example, 85 wt % to 99 wt %, 87 wt % to 95 wt %, or 90 wt % to 98 wt %. When the amount of the first positive electrode active material satisfies the range, the safety can be improved without a reduction in the capacity.

The second positive electrode active material may include, for example, $LiFePO_4$.

The second positive electrode active material may be included in an amount in a range from 1 wt % to 15 wt % based on the total weight of the positive electrode active material layer, for example, 2 wt % to 15 wt %, 2 wt % to 12 wt %, or 2 wt % to 10 wt %. When the amount of the second positive electrode active material satisfies the range, the safety can be improved without a reduction in the capacity.

Usable examples of the positive electrode current collector may include, but not limited to, aluminum and nickel.

Optionally, the positive electrode active material layer may further include a positive electrode conductive material and a positive electrode binder.

Each of the positive electrode conductive material and the positive electrode binder may be included in an amount in a range from 1 wt % to 5 wt % based on the total weight of the positive electrode active material layer.

The positive electrode conductive material may be used to provide the positive electrode with conductivity (e.g., electrical conductivity), and kinds of the positive electrode conductive material are the same as those of the negative electrode conductive material.

The positive electrode binder may serve to improve binding properties of the positive active material particles with one another and with a current collector, and examples of the positive electrode binder may include, but not limited to, polyvinyl alcohol, carboxymethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, and nylon.

The electrolyte includes a non-aqueous organic solvent and a lithium salt.

The non-aqueous organic solvent serves as a medium for transmitting ions taking part in the electrochemical reaction of a battery. Examples of the non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, methylpropionate, ethylpropionate, γ-butyrolactone, decanolide, valerolactone, mevalonolactone, caprolactone and the like. Examples of the ether-based solvent may include dibutyl ether, tetraglyme, diglyme, dimethoxyethane, 2-methyltetrahydrofuran, tetrahydrofuran, and the like. Examples of the ketone-based solvent may include cyclohexanone, and the like. In addition, examples of the alcohol-based solvent may include ethyl alcohol, isopropyl alcohol, and the like, and examples of the aprotic solvent may include nitriles, such as R—CN (wherein R is a C2 to C20 linear, branched, or cyclic hydrocarbon group, or includes a double bond, an aromatic ring, or an ether bond), amides, such as dimethylformamide, dioxolanes, such as 1,3-dioxolane, or sulfolanes.

The non-aqueous organic solvent may be used alone or in a mixture of more than one material. When the non-aqueous organic solvent is used in a mixture, the mixture ratio can be controlled in accordance with desirable battery performance and can be any suitable mixture ratio generally used in the art.

In addition, the carbonate-based solvent may be used by mixing a cyclic carbonate and a chain-type carbonate. In this case, when the cyclic carbonate and the chain-type carbonate are mixed together to a volume ratio in a range from 1:1 to 1:9, excellent performance of the electrolyte may be demonstrated.

The aromatic hydrocarbon-based organic solvent may be an aromatic hydrocarbon-based compound represented by the following Chemical Formula (2):

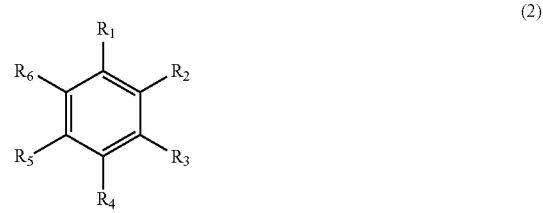

(2)

wherein R1 to R6 are the same or different and are selected from the group consisting of a hydrogen, a halogen, a C1 to C10 alkyl group, a C1 to C10 haloalkyl group, and a combination thereof.

Examples of the aromatic hydrocarbon-based organic solvent may be selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

In order to improve the cycle life of a battery, the non-aqueous electrolyte may further include vinylene carbonate or an ethylene carbonate-based compound represented by the following Chemical Formula (3):

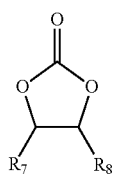

(3)

wherein R7 and R8 R6 are the same or different and are selected from the group consisting of a hydrogen, a halogen group, a cyano group (CN), a nitro group (NO2) and a fluorinated C1 to C5 alkyl group, wherein at least one of the R7 and R8 is a halogen group, a cyano group (CN), a nitro group (NO2), or a fluorinated C1 to C5 alkyl group, but both of R7 and R8 are not necessarily hydrogens.

Representative examples of the ethylene carbonate-based compound may include difluoro ethylene carbonate, chloroethylene carbonate, dichloroethylene carbonate, bromoethylenecarbonate, dibromoethylene carbonate, nitroethylene carbonate, cyanoethylenecarbonate, fluoroethylene carbonate, and the like. When an additive for improving the cycle life is additionally used, the amount of the additive may be suitably or appropriately controlled.

The lithium salt dissolved in the organic solvent functions as a supply source of lithium ions in the battery to enable a basic operation of a rechargeable lithium battery and promotes movement of lithium ions between positive and negative electrodes. Examples of the lithium salt may include as a supporting salt one or more selected from $LiPF_6$, $LiBF_4$, $LiSbF_6$, $LiAsF_6$, $LiN(S_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ where x and y are natural numbers, LiCl, LiI and $LiB(C_2O_4)_2$, and lithium bis(oxalato) borate (LiBOB). The lithium salt may be used at a concentration in a range from 0.1 M to 2.0 M, and in one embodiment, at a concentration in a range from 0.5 to 2.0 M. When the lithium salt is included at the above concentration range, the electrolyte may demonstrate suitable or appropriate conductivity and viscosity, thereby enhancing lithium ion mobility.

As described above, the separator 125c may be positioned between the positive electrode 125b and the negative electrode 125a. The separator 125c may be made of, for example, one selected from a glass fiber, polyester, polyethylene, polypropylene, polytetrafluoroethylene and a combination thereof, and may be a non-woven or woven material.

The separator made of, for example, a polyolefin-based polymer, such as polyethylene or polypropylene, may be mainly used for a lithium secondary battery. In order to obtain heat resistance or mechanical strength, a separator coated with a composition including a ceramic component or a polymeric material, may be used and, optionally, may have a single-layered structure or a multi-layered structure.

The following examples illustrate aspects of the present disclosure in more detail. These examples, however, are provided only for illustrative purposes but are not intended to limit the scope of the present disclosure.

Fabrication of Lithium Secondary Battery

Example 1: Battery Including 2 μm Flake-Shaped PE Particles

A positive electrode active material slurry was prepared by mixing 95 wt % of a positive electrode active material having $LiCoO_2/LiFePO_4$ (LCO/LFP) mixed to a weight ratio of 9:1, 3 wt % of polyvinylidenfluoride as a binder, and 2 wt % ketjen black as a conductive material in N-methylpyrrolidone as a solvent. The positive electrode active material slurry was coated on both surfaces of an Al current collector, dried and pressed to provide a positive electrode (cathode) including a positive electrode active material layer.

A negative electrode active material slurry was prepared by mixing 98 wt % of graphite, 0.8 wt % of carboxymethyl cellulose and 1.2 wt % of styrene-butadiene rubber in pure water. The negative electrode active material slurry was coated on both surfaces of a Cu current collector, dried and pressed to provide a negative electrode (anode) including a negative electrode active material layer.

48 wt % of flake-shaped PE particles having an average particle size of 2 μm (Major axis length/Minor axis length=about 2, thickness=about 0.6 μm), 47 wt % of alumina (Average particle diameter (D50)=0.7 μm) and 5 wt % of acrylated styrene-based rubber as a binder were mixed in an alcohol-based solvent to prepare a PE/alumina slurry.

The PE/alumina slurry was coated on the surface of the negative electrode, dried and pressed to provide a coated negative electrode including a coating layer including flake-shaped PE particles.

The positive electrode, the separator including a PE/PP multi-layered substrate, and the negative electrode including the coating layer including the flake-shaped PE particles were sequentially stacked to fabricate an electrode assembly shown in FIGS. 17A and 17B, followed by injecting an electrolyte, thereby fabricating a secondary battery.

Example 2: Battery Including 4 μm Flake-Shaped PE Particles

A secondary battery was fabricated in substantially the same manner as in Example 1, except that a negative electrode was provided using flake-shaped PE particles having an average particle size of 4 μm (Major axis length/Minor axis length=about 2.4, thickness=about 0.6 μm).

Example 3: Battery Including 6 μm Flake-Shaped PE Particles

A secondary battery was fabricated in substantially the same manner as in Example 1, except that a negative electrode was provided using flake-shaped PE particles having an average particle size of 6 μm (Major axis length/Minor axis length=about 2.4, thickness=about 0.6 μm).

Comparative Example: Battery Including Spherical PE Particles

A secondary battery was fabricated in substantially the same manner as in Example 1, except that a negative electrode was provided using a dispersion liquid prepared by dispersing spherical PE particles having an average particle size of 4 μm, instead of 2 μm flake-shaped PE particles, in an alcohol-based solvent.

Evaluation Example

1. Evaluation of Electrode Plate Resistance Increase Rates

Figure 24:
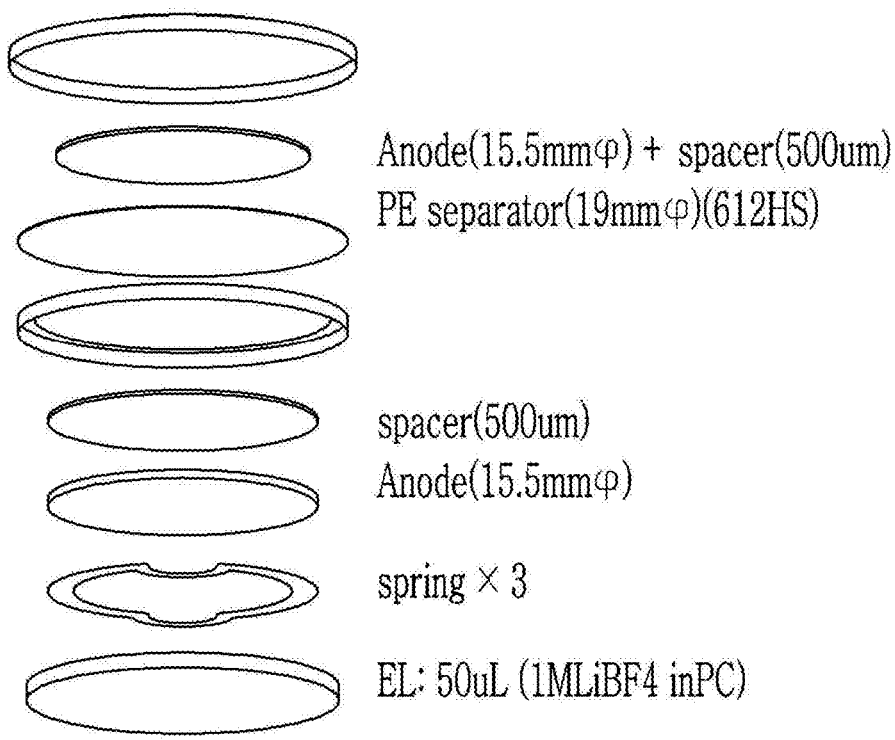
FIG. 24 is a diagram showing a symmetrical coin-type cell fabricated for evaluating resistance increase rates of an electrode plate.

A negative electrode (anode) including a coating layer including the flake-shaped PE particles according to Example 1, a separator including a PE/PP multi-layered substrate, and a negative electrode including a coating layer including the flake-shaped PE particles according to Example 1, were sequentially stacked in that order, followed by injecting an electrolyte prepared by dissolving 1M LiBF4 in propylene carbonate (PC), thereby fabricating a symmetrical coin-type battery shown in FIG. 24.

FIG. 24 is a diagram showing symmetrical coin-type batteries fabricated for evaluating resistance increase rates of electrode plates.

A temperature sensor and a resistance meter were installed on the fabricated symmetrical coin-type battery, and the battery was inserted into a temperature-varying chamber for evaluation. Changes in temperatures and resistances of the symmetrical coin-type battery were evaluated while increasing the temperature at a rate of 10° C./min, and increase rate evaluation results of AC resistance (ACR) (ohm) of electrode plates depending on the temperature is shown in FIG. 22.

Figure 22:
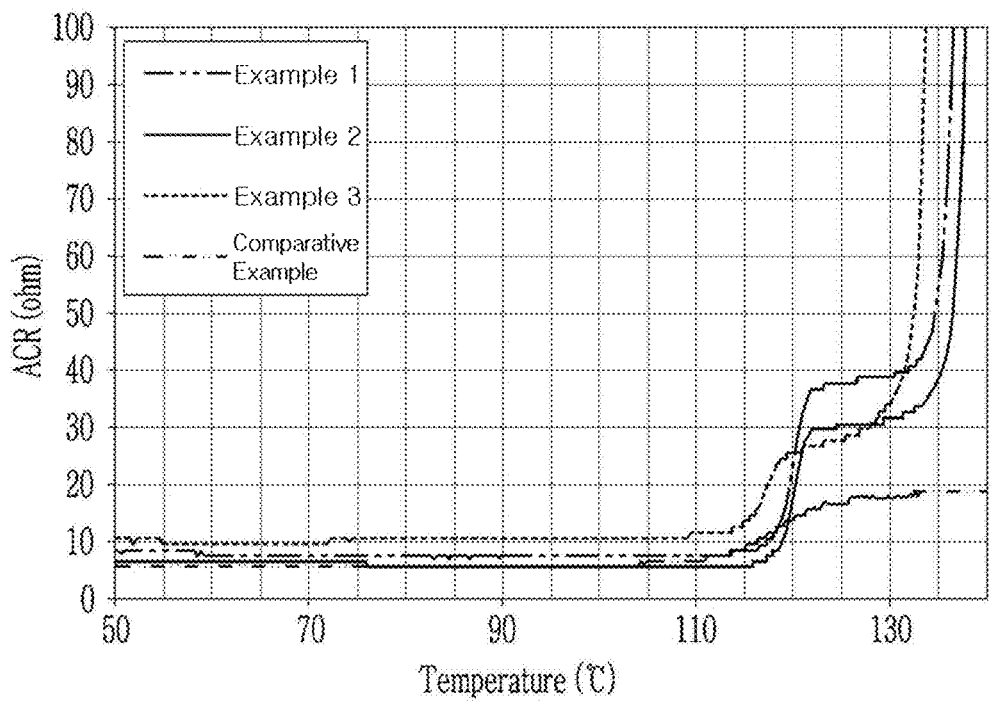
FIG. 22 is a graph showing ACR increase rate evaluation results of electrode plates depending on temperatures.

FIG. 22 is a graph showing FIG. 22 is a graph showing ACR increase rate evaluation results of electrode plates depending on temperatures.

As confirmed from FIG. 22, AC resistance (ACR) increase rates of electrode plates in Examples 1 to 3 were remarkably increased at a high temperature of 120° C. or higher, compared to the ACR increase rate of an electrode plate in Comparative Example.

From the evaluation results, in the battery cell including the electrode composition according to an embodiment, ion passages can be effectively shut down during thermal runaway due to thermal/physical impacts. Therefore, it can be expected for a shut-down function to be manifested quickly.

2. Evaluation of Cycle-Life Characteristics

Figure 23:
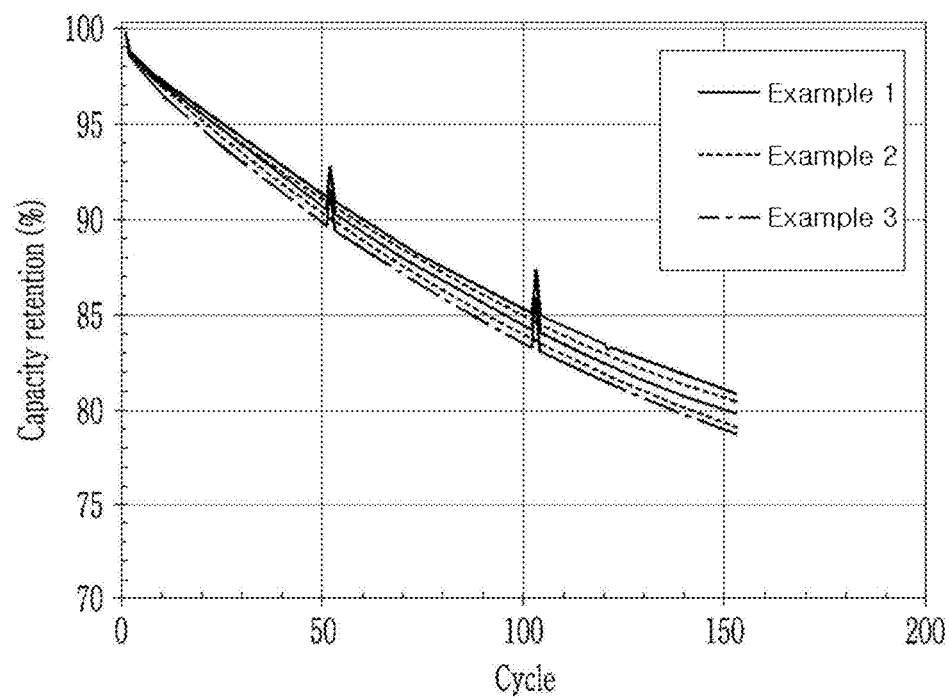
FIG. 23 is a graph showing capacity retention evaluation results of lithium secondary batteries according to Examples for 150 cycles.

Lithium secondary batteries fabricated in Examples 1 to 3 were charged at a charge potential of 4.4 V at 0.5 C/0.5 C rates and then discharged to reach 3.0 V. After 150 cycles, cell capacity decrease rates were measured, and the results are shown in FIG. 23. At the 51st and 101st cycles, the battery cells were charged at a charge potential of 4.4 V at 0.5 C/0.5 C and then discharged to reach 3.0 V. Then, capacity retentions were measured to evaluate capacity recovery.

FIG. 23 is a graph showing capacity retention evaluation results of lithium secondary batteries according to Examples 1 to 3 for 150 cycles.

Referring to FIG. 23, even after 150 cycles, it was confirmed that excellent capacity retention ratios (%) were demonstrated.

As a result, the lithium secondary battery according to an embodiment of the present disclosure can effectively demonstrate a shut-down function while maintaining excellent battery characteristics.

While the subject matter of the present disclosure has been shown and described with reference to exemplary embodiments thereof, it will be understood by those of ordinary skill in the art that various changes in form and details may be made therein without departing from the spirit and scope of the present disclosure as defined by the following claims and their equivalents.

| Explanation of Some Reference Numerals | |
|---|---|
| 100, 200: Energy storage module | 110, 210: Cover member |
| 120, 220: Battery cell | 130: Insulation spacer |
| 131: Sheet | 132: Edge |
| 140: Top plate | 141: Duct |
| 143: Opening | 150, 150A, 150B, 150C: Extinguisher sheet |
| 151: Opening | 152, 152A, 152B: Receiving space |
| 160: Top cover | |

What is claimed is:

1. An energy storage module comprising:
a cover member accommodating a plurality of battery cells in an internal receiving space, the battery cells being arranged in a first direction, each of the battery cells comprising a vent;
a top plate coupled to a top of the cover member and comprising a plurality of ducts respectively corresponding to the vents of the battery cells;
a top cover coupled to a top of the top plate and having a plurality of discharge openings, a first one of the ducts being aligned with a first one of the discharge openings to be in fluid communication therewith, a second one of the ducts being aligned with a second one of the discharge openings to be in fluid communication therewith; and
an extinguisher sheet between the top cover and the top plate, the extinguisher sheet having a first opening through which the first one of the ducts is in fluid communication with the first one of the discharge openings and a second opening through which the second one of the ducts is in fluid communication with the second one of the discharge openings, the extinguisher sheet being configured to emit a fire extinguishing agent at a reference temperature.

2. The energy storage module of claim 1, wherein the extinguisher sheet extends in the first direction.

3. The energy storage module of claim 1, further comprising a plurality of insulation spacers respectively between adjacent ones of the battery cells.

4. The energy storage module of claim 3, wherein the top plate has openings respectively corresponding to the insulation spacers.

5. The energy storage module of claim 4, wherein the extinguisher sheet is over the openings in the top plate and over the insulation spacers.

6. The energy storage module of claim 1, wherein the extinguisher sheet has an outer cover comprising polyurea or polyurethane and a fire extinguishing agent in a receiving space defined by the outer cover.

7. The energy storage module of claim 6, wherein the receiving space is a tube shape, or
wherein the receiving space comprises a plurality of receiving spaces in capsule shapes.

8. The energy storage module of claim 7, wherein the fire extinguishing agent comprises halogenated carbon.

9. The energy storage module of claim 1, wherein the extinguisher sheet comprises a plurality of sheets respectively configured to emit the fire extinguishing agent at different temperatures.

10. The energy storage module of claim 9, wherein the sheets of the extinguisher sheet are stacked on each other.

11. The energy storage module of claim 1, further comprising a plurality of the extinguisher sheets.

12. The energy storage module of claim 11, wherein each of the extinguisher sheets extends in the first direction.

13. The energy storage module of claim 11, wherein the extinguisher sheets are spaced from the battery cells by a first distance, and
wherein an upper end of the ducts is spaced from the corresponding one of the battery cells by a second distance, the first distance being greater than the second distance.

14. The energy storage module of claim 1, wherein a proportion of the fire extinguishing agent contained in the extinguisher sheet to the total weight of the extinguisher sheet is in a range from 30% to 50%.

15. The energy storage module of claim 1, wherein the fire extinguishing agent is contained in the extinguisher sheet in an amount of 0.12 g/cm³ to 0.82 g/cm³.

16. The energy storage module of claim 1, wherein each of the battery cells comprises:
a negative electrode comprising: a negative electrode current collector; a negative electrode active material layer on the negative electrode current collector; and a negative electrode function layer on the negative electrode active material layer; and
a positive electrode comprising: a positive electrode current collector; and a positive electrode active material layer on the positive electrode current collector,
wherein the negative electrode function layer comprises flake-shaped polyethylene particles, and the positive electrode active material layer comprises a first positive electrode active material comprising at least one composite oxide of lithium and a metal selected from the group consisting of cobalt (Co), manganese (Mn), nickel (Ni), and a combination of these metals and a second positive electrode active material comprising a compound represented by the Chemical Formula (1):

$$Li_aFe_{1-x}M_xPO_4 \qquad (1)$$

wherein 0.90≤a≤1.8, 0≤x≤0.7, and M is Mg, Co, Ni, or a combination thereof.

17. The energy storage module of claim 16, wherein the flake-shaped polyethylene particles have an average particle diameter (D50) in a range from 1 μm to 8 μm.

18. The energy storage module of claim 16, wherein the flake-shaped polyethylene particles have an average particle diameter (D50) in a range from 2 μm to 6 μm.

19. The energy storage module of claim 16, wherein the flake-shaped polyethylene particles have a thickness in a range from 0.2 μm to 4 μm.

20. The energy storage module of claim 16, wherein the first positive electrode active material and the second positive electrode active material are contained in a weight ratio in a range from 97:3 to 80:20.

21. The energy storage module of claim 1, wherein the first one of the discharge openings is formed of a plurality of sub-discharge openings.

* * * * *

UNITED STATES PATENT AND TRADEMARK OFFICE
CERTIFICATE OF CORRECTION

| | | |
|---|---|---|
| PATENT NO. | : 11,799,167 B2 | Page 1 of 1 |
| APPLICATION NO. | : 16/901522 | |
| DATED | : October 24, 2023 | |
| INVENTOR(S) | : Eun Ok Kwak et al. | |

It is certified that error appears in the above-identified patent and that said Letters Patent is hereby corrected as shown below:

In the Drawings

On Sheet 16 of 24, Line 1, above "200" insert -- FIG. 14 --.

Signed and Sealed this
Twenty-seventh Day of February, 2024

*Katherine Kelly Vidal*

Katherine Kelly Vidal
*Director of the United States Patent and Trademark Office*